United States Patent [19]
Tanaka et al.

[11] Patent Number: 4,674,895
[45] Date of Patent: Jun. 23, 1987

[54] DOT MATRIX PRINTER CONTROL AND STORAGE DEVICE

[75] Inventors: Hidetake Tanaka, Tokyo; Akio Niki, Fujisawa; Osamu Kuramochi, Yokohama, all of Japan

[73] Assignee: Ricoh Company, Ltd., Tokyo, Japan

[21] Appl. No.: 799,856

[22] Filed: Nov. 20, 1985

[30] Foreign Application Priority Data

Nov. 27, 1984 [JP] Japan .................. 59-248677

[51] Int. Cl.$^4$ .............................. B41J 3/12
[52] U.S. Cl. .................. 400/121; 400/303; 400/323; 364/518
[58] Field of Search ............ 400/121, 303, 124, 306, 400/61-63, 70, 323; 364/518, 519

[56] References Cited
U.S. PATENT DOCUMENTS 4,159,882 7/1979 Sanders et al. ............... 400/124
4,388,010 6/1983 Mott ........................... 400/692
4,459,050 7/1984 Goldberg .................... 400/124 X Primary Examiner—Paul T. Sewell
Attorney, Agent, or Firm—Oblon, Fisher, Spivak, McClelland & Maier

[57] ABSTRACT

A printer capable of operating in a bidirectional printout mode by converting a print code to pattern data and using a print head in which print elements are arranged in a plurality of arrays. A buffer control is provided for controlling in a ring structure entry and retrieval of pattern data into and out of an image buffer. A detachable font cassette stores the pattern data and data associated with print configurations. A pattern data store stores print pattern data in blocks for each of the print element arrays.

1 Claim, 39 Drawing Figures

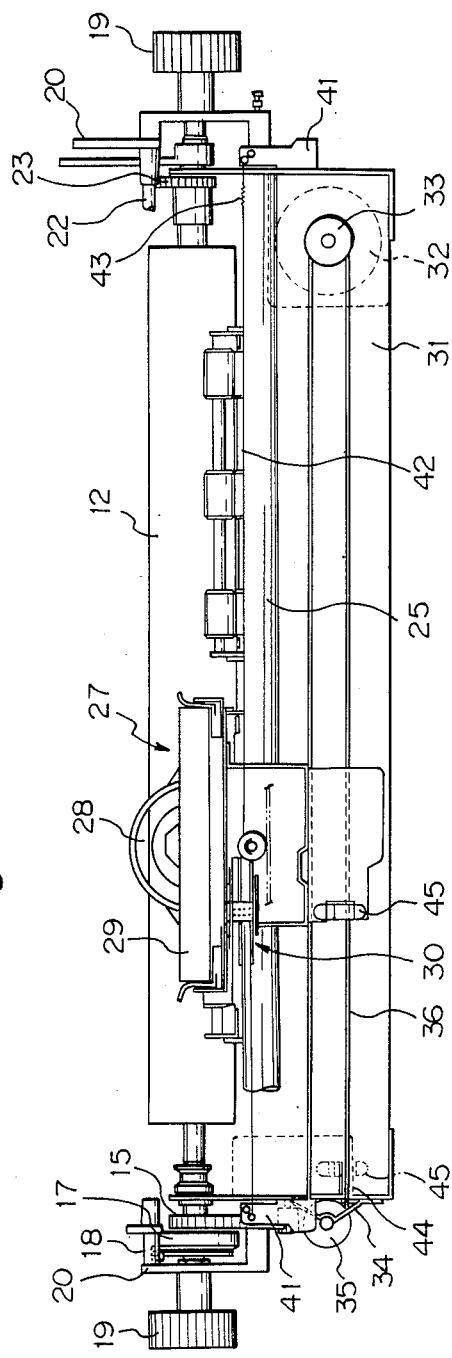
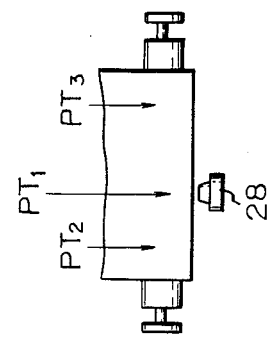
Fig. 3
Fig. 26

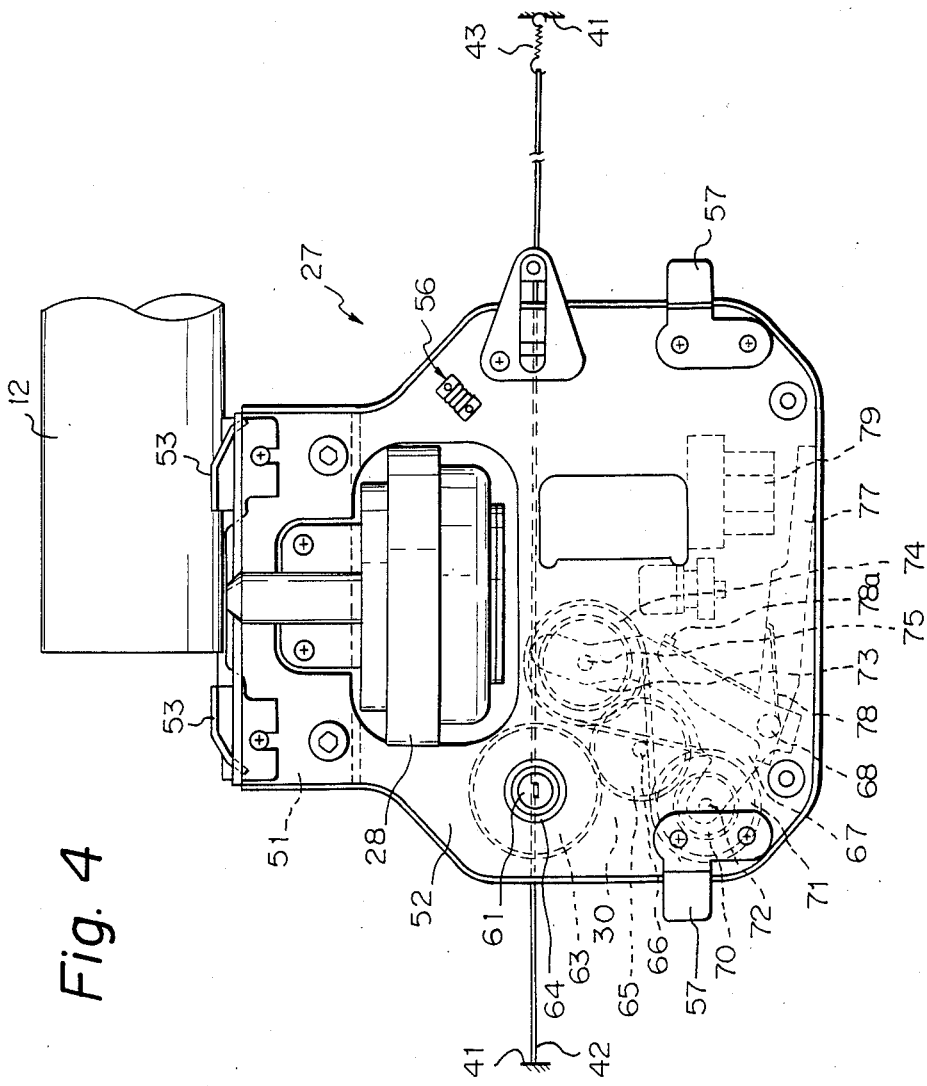

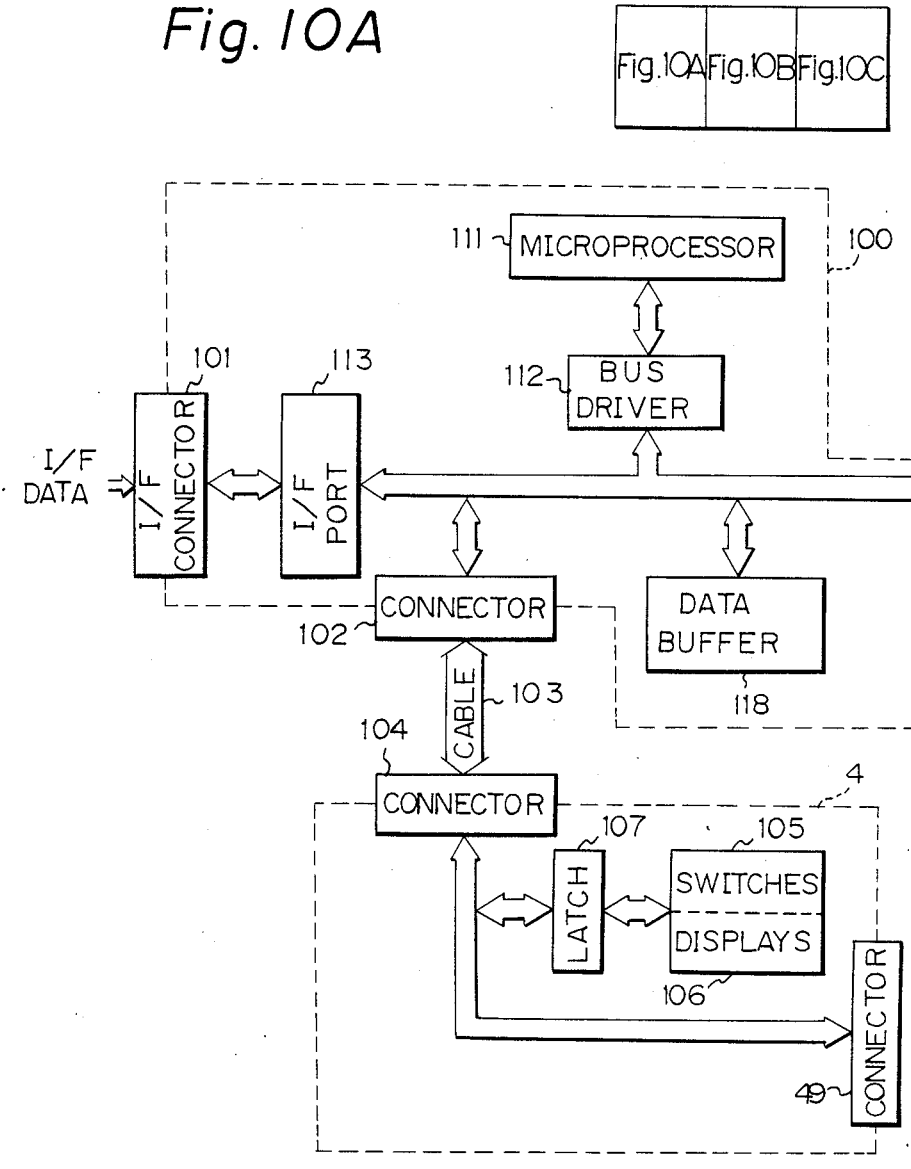

Fig. 18A
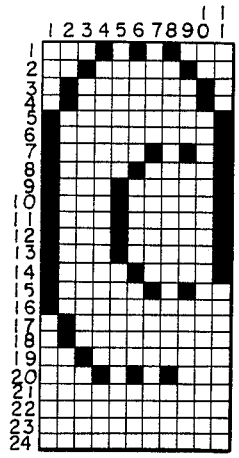
Fig. 19
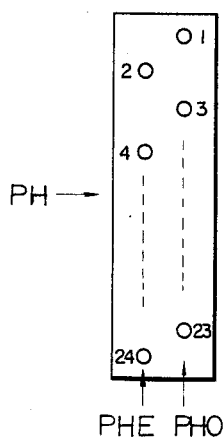
Fig. 18B

Fig. 25A
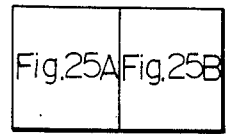
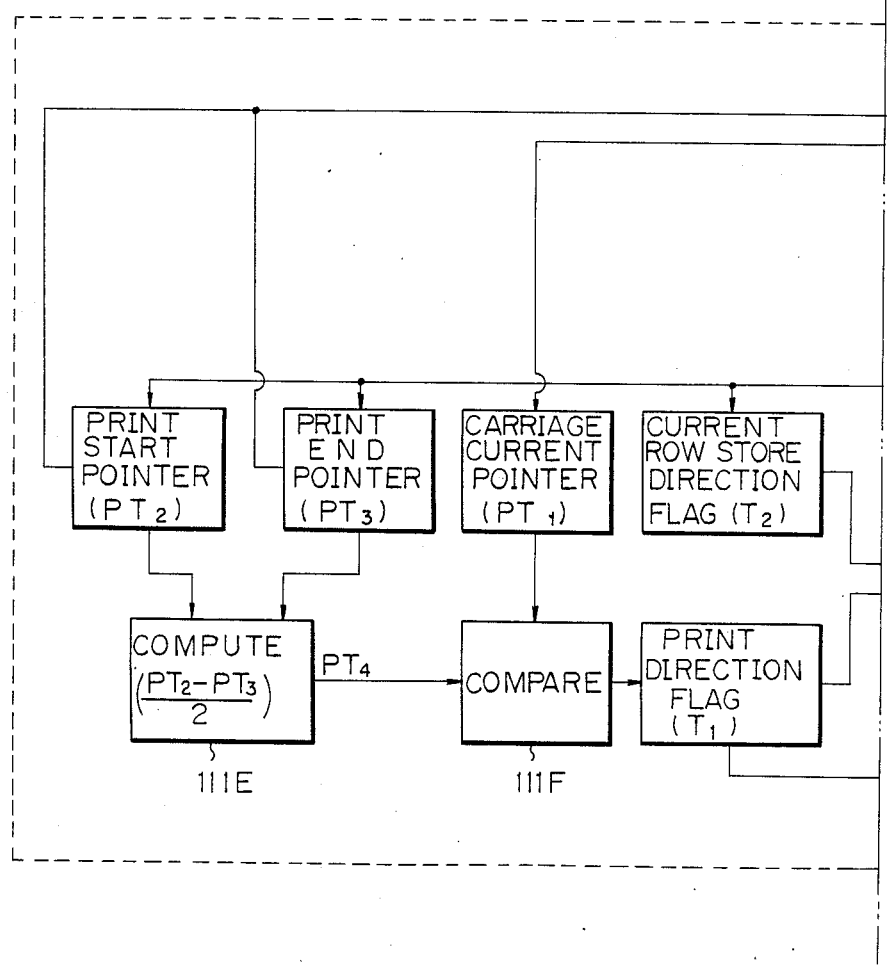

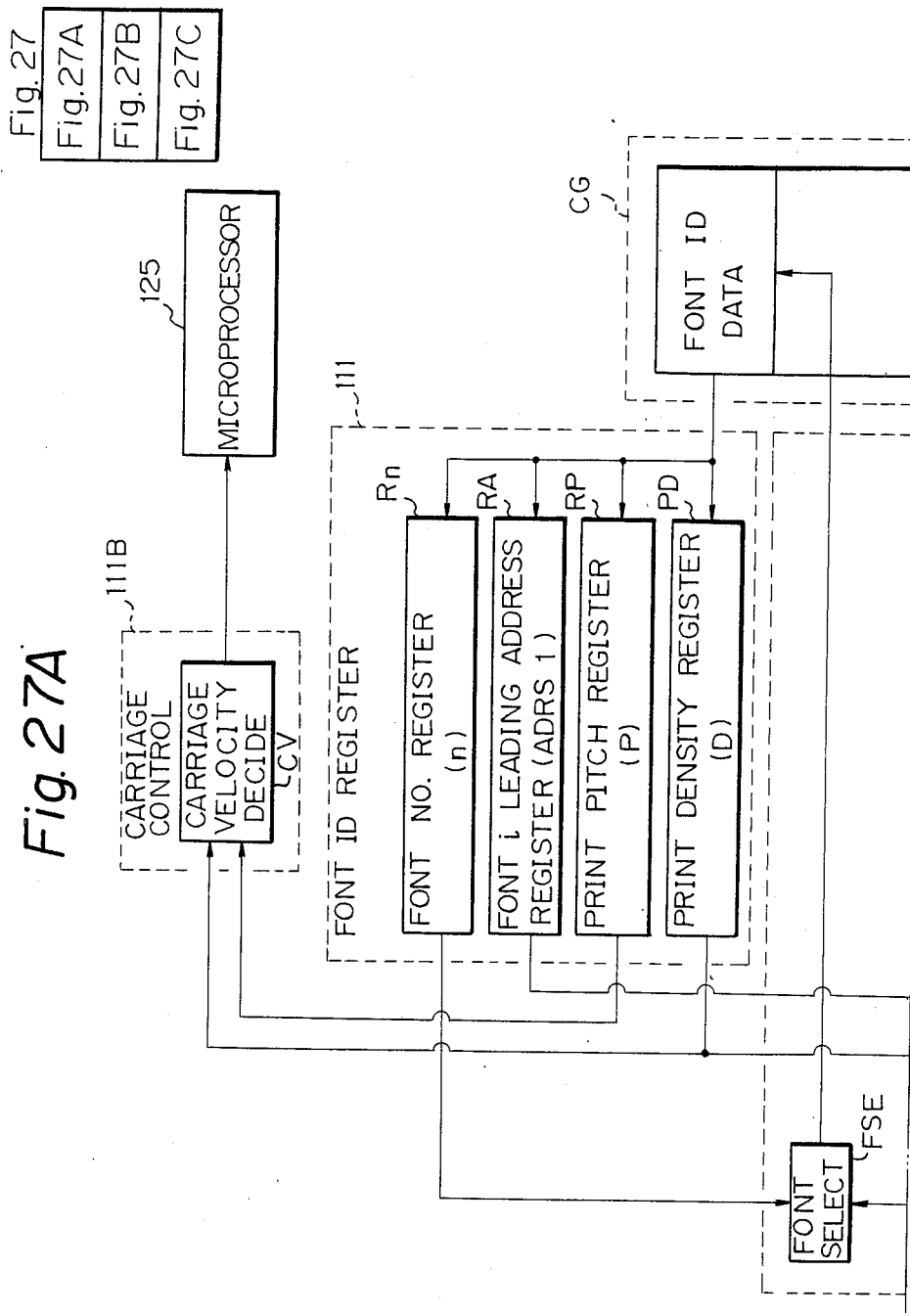

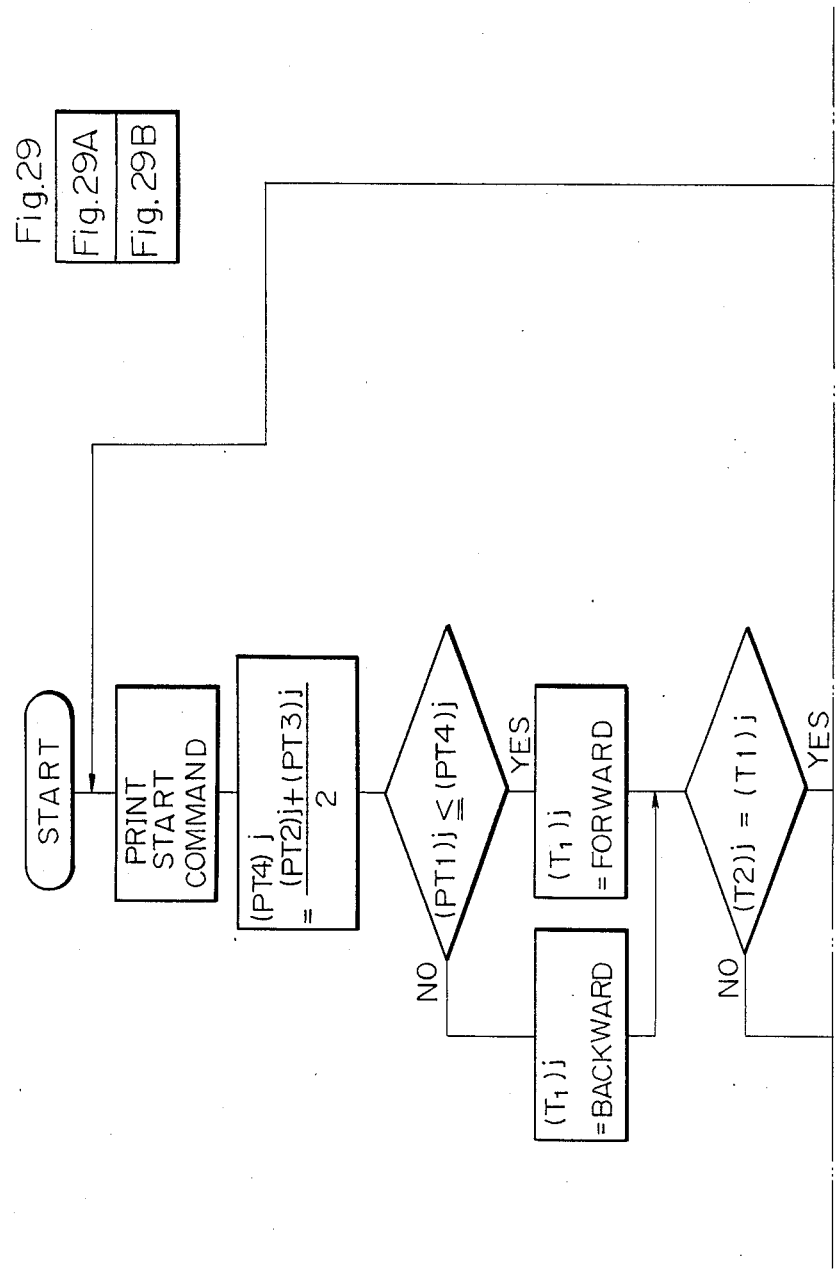

DOT MATRIX PRINTER CONTROL AND STORAGE DEVICE

BACKGROUND OF THE INVENTION

The present invention relates to a printer which converts a print code to pattern data and is capable of printing out the data in a bidirectional mode using a print head in which print elements are arranged in a plurality of arrays.

Generally, in a dot impact printer, a thermal printer, a thermal transfer printer, an ink jet printer and other various types of printers, print data are converted to pattern data such as characters, diagrams and others (represented by "characters" hereinafter) and, then, the pattern data are developed on an image buffer to print out characters.

In a prior art printer of the kind described, pattern data to be printed out are sequentially stored in addresses of an image buffer starting at the leading address to be developed on the image buffer and, then, sequentially read out of the image buffer starting at the leading address to be printed out. The problem with such a printer is that in a bidirectional printout mode since data entry from a host system constantly proceeds in the forward direction, during a reverse printout stroke data have to be read out in the reverse direction. That is, since no address in the image buffer becomes empty until all the image data have been read out during a forward printout stroke, data to be printed out by a reverse printout stroke cannot be stored during that period of time, resulting in a limited print speed.

Meanwhile, such a piror art printer is furnished with a character generator which comprises a read only memory (ROM) or the like having pattern data stored beforehand therein. To enhance the performance of a printer, it is desirable to furnish the printer with various kinds of printing functions such as a function of printing Kanji (Chinese characters) of the first level, and that of printing Kanji of the second level, and an ultrahigh-speed printing function, a high-speed printing function, a high-density printing function, etc. One approach to implement such various functions is storing in a ROM the pattern data representative of all the characters, Kanji, of the first and second levels or the pattern data representative of all the characters which belong to all the possible fonts, or print configurations, such as an ultrahigh-speed printing, a high-speed printing and a high-density printing, the ROM being installed in a printer body. However, should a ROM or like store loaded with patterns of all the fonts be permanently built in a printer body, it would increase the memory capacity of the print body as well as cost to a prohibitive degree.

In a print head, print elements are usually arranged in two staggered arrays one of which is made up of odd print elements and the other, even print elements. Hence, if print pattern data are stored according to the order of arrangement of pixels which are so printed out, print element drive data and the print pattern data are brought out of coincidence. In light of this, it has been customary to perform a printout control such that, for example, drive data associated with even print elements are obtained based on even ones of print pattern data and drive data associated with odd print elements based on odd ones. Specifically, such a prior art printout control scheme consists in reading three bytes (one column) of print pattern data which are aligned with odd print elements positions, then extracting only those data which are associated with odd print elements, then rearranging and storing the extracted data (1.5 bytes) in a data buffer, then reading three bytes (one column) of print pattern data which are aligned with the even print element positions, then extracting data associated with the even print elements, and then rearranging and storing the extracted data (1.5 bytes) in the data buffer. However, such awkward steps of selecting only odd data or even data out of one byte of data which are read out of a character generator and, then, rearranging the selected data result in a disproportionate data processing time which is contrary to the demand for high-speed data processing and, therefore, a high-speed printer.

SUMMARY OF THE INVENTION

It is therefore a first object of the present invention to increase the print speed of a printer which is capable of operating in a bidirectional printout mode.

It is a second object of the present invention to allow different fonts of characters to be readily printed out without increasing the memory capacity of a printer body.

It is a third object of the present invention to enhance high-speed data processing and, thereby, high-speed printing operation of a printer.

It is another object of the present invention to provide a generally improved printer.

In accordance with one aspect of the present invention, there is provided a printer for printing out data in a bidirectional mode by converting print data to pattern data which comprises a print head having print elements arranged in a plurality of arrays, an image buffer for developing the pattern data, and a buffer control for controlling in a ring structure entry and retrieval of the pattern data into and out of the image buffer.

In accordance with another aspect of the present invention, there is provided a printer capable of printing data in a bidirectional mode by converting print data to pattern data which comprises an image buffer for developing the pattern data, and a buffer control for controlling in a ring structure entry and retrieval of the pattern data into and out of the image buffer.

In accordance with another aspect of the present invention, there is provided a printer which comprises a print head having print elements arranged in a plurality of arrays, and a pattern data store for storing print pattern data in block for each of the print element arrays.

In accordance with another aspect of the present invention, there is provided a printer which comprises a circuit for converting print data to pattern data, and a detachable font cassette storing the pattern data and data which are associated with print configurations.

The above and other objects, features and advantages of the present invention will become more apparent from the following detailed description taken with the accompanying drawings.

BRIEF DESCRIPTION OF THE DRAWINGS

FIGS. 2 and 3 show a specific mechanical arrangement of the printer of FIG. 1 in a plan view and a front view, respectively;

FIGS. 4 and 5 show details of a carriage included in the mechanism of FIGS. 2 and 3 in a plan view and a side elevational view, respectively;

FIGS. 10A, 10B and 10C comprise a block diagram, connected as shown in FIG. 10, showing a specific construction of a control section which is built in the printer;

FIGS. 17A, 17B, 18A and 18B, show different systems for storing patterns in the font cassette;

FIG. 19 shows an arrangement of print elements in a print head;

FIGS. 25A and 25B comprise a block diagram connected as shown in FIG. 25, showing essential functions which are assigned to a master microprocessor of FIG. 10;

FIG. 26 is a view of pointers associated with the master microprocessor;

FIGS. 27A-27C comprise a functional block diagram, connected as shown in FIG. 27, associated with a buffer input control of FIG. 25;

FIGS. 29A and 29B comprise a flowchart connected as shown in FIG. 29, totally demonstrating a buffer input/output control processing.

DESCRIPTION OF THE PREFERRED EMBODIMENT

While the printer of the present invention is susceptible of numerous physical embodiments, depending upon the environment and requirements of use, a substantial number of the herein shown and described embodiment have been made, tested and used, and all have performed in an eminently satisfactory manner.

Figure 1:
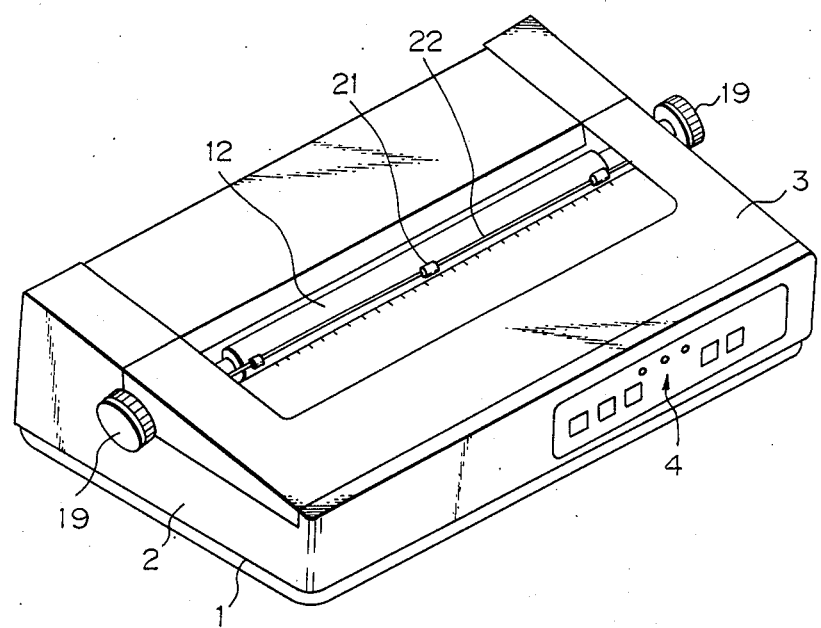
FIG. 1 is an external perspective view of a printer to which the present invention is applied.

Referring to FIG. 1, a wire dot impact printer to which the present invention is applied is shown in a perspective external view. A housing of the printer comprises a lower casing 1 and an upper casing 2 for accommodating a mechanical section and a control section, and an openable cover 3 for facilitating replacement of a ribbon cassette, a font cassette and other parts which will be described. A control panel 4 which is mounted on the front of the printer is provided with various switches such as a form feed switch, an on-line/off-line switch and a pose switch, as well as various displays such as ribbon end display and a paper end display.

Figure 2:
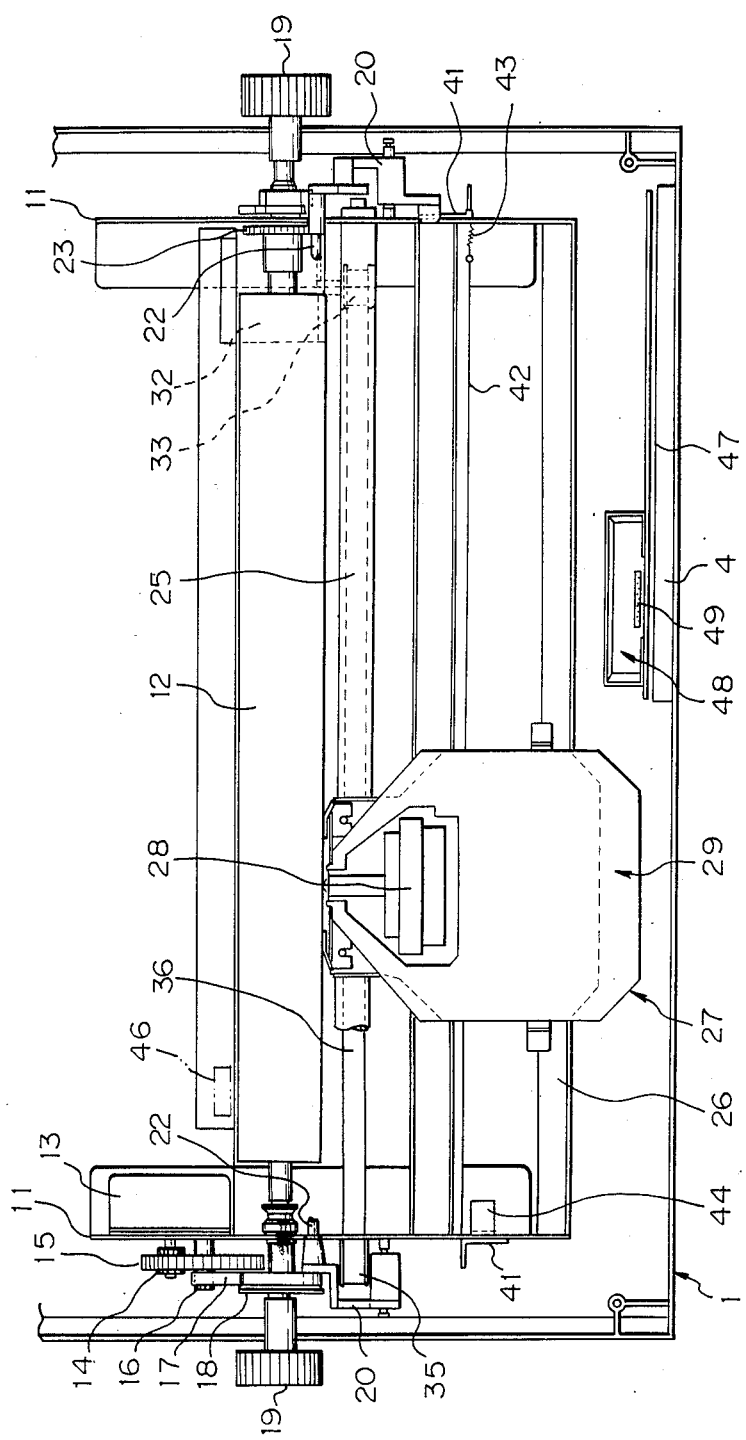

Referring to FIGS. 2 and 3, the mechanical section installed in the printer includes a platen 12 which is rotatably supported by a pair of spaced frames 11 and 11. A paper which serves as a printing medium is passed over the platen 12. The platen automatically feeds the paper driven by a line feed motor 13 through a motor gear 14, an idle gear 15, a gear 16 movable integrally with the idle dear 15, a timing belt 17, and a platen gear 18. The line feed motor 13 is implemented with a stepping motor. Knobs 19 and 19 respectively are mounted to opposite ends of the platen 12 and manually rotatable to rotate the platen 12. Manual rotation of the platen 12 may be effected in the event of, for example, loading a paper or removing it. A paper bail 22 carrying bail rollers 22 therewith (see FIG. 1) is positioned in front of the platen 12 and pivotally supported by spaced bail frrames 20 and 20, which in turn are rotatably mounted to the frames 11 and 11. A platen gear 23 is rigidly connected to the opposite side of the platen 12 to the platen gear 18 in order to transmit a driving force to a paper feed mechanism of a paper feed device, e.g. form tractor.

Rigidly supported by the frames 11 and 11 are a guide rod 25 and a stay 26. A carriage 27 is mounted on the guide rod 25 and stay 26 in such a manner as to be movable along and parallel to the axis of the platen 12. The carriage 27 carries a print head 28, a ribbon cassette 29 loaded with an ink ribbon, a ribbon feed mechanism 30 for feeding the ink ribbon (described later in detail), etc. The ink ribbon may comprise a fabric ribbon, a multistrike ribbon, or like film ribbon. A timing pulley 33 is directly connected to an output shaft of a space (carriage feed) motor 32, which is fixed to a subframe 31 and comprised of a stepping motor, while a guide pulley 35 is retained by the frame 11 and tensioned by a spring plate 34. A timing belt 36 is passed over the timing pulley 33 at one end and over the guide pulley 35 at the other end. Fixed to the lower portion of the carriage 27, the timing belt 36 is driven by the space motor 32 to in turn move the carriage 27.

Two wire holders 41 and 41 are mounted on the frames 11 and 11, respectively. In order to transform the movement of the carriage 27 into a ribbon feeding force which the ribbon feed mechanism 30 is to exert, a wire 42 is directly fixed to one of the wire holders 41 and 41 at one end and fixed to the other wire holder 41 through a spring 43 at the other end. A light intercepting plate 44 is mounted on the left frame 11, while a home sensor 45 which comprises a transmission type photosensor is mounted on the carriage 27. The interceptor 44 and the home sensor 45 cooperate to sense a home position of the carriage 27. As shown in FIG. 2, a paper end sensor which comprises a reflection type photosensor is positioned at the rear left of the platen 12 and mounted on a deflector which, although not shown, is adapted to guide a paper. As also shown in FIG. 2, a predetermined circuit board 47 is mounted on the back of the control panel 4. A cassette holder 48 is provided on the circuit board 47 to be loaded with a font cassette, which stores pattern data in accordance with the present invention. A connector 49 is provided on the bottom of the cassette holder 48 to which a connector of the font cassette is connectable.

Figure 5:
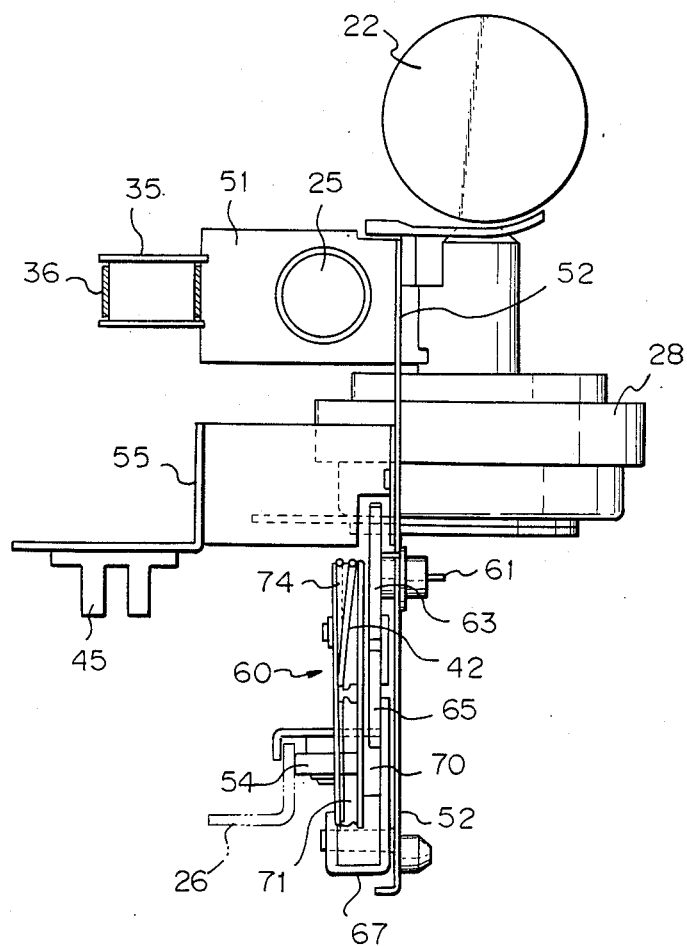

Referring to FIGS. 4 and 5, the carriage 27 of the printer is shown in detail. As shown, the carriage 27 comprises a carriage block 51 which is slidably mounted on the guide rod 25. The timing belt 36 is mounted on the underside of the carriage block 51. A top plate 52 is rigidly mounted on the carriage block 51 to support the print head 28 thereon. Paper guides 53 and 53 are provided at opposite front ends of the top plate 52 of the carriage 27 in order to guide a paper in the event of insertion of a paper and during a printout operation. A roller 54 is rotatably mounted on the underside of the top plate 52 to roll on the stay 26. The carriage home sensor 45 is mounted on a lower portion of a support plate 55 which is rigid on the underside of the top plate 52.

Mounted on the upper surface of the top plate 52 is a ribbon end sensor 56 which comprises a transmission type photosensor and serves to sense the end of a multistrike ribbon when such a ribbon is used. Cassette retainers 57 and 57 for holding the ribbon cassette 29 are mounted at opposite rear end portions of the top plate 52. The ribbon feed mechanism 30 is mounted on the underside of the top plate 52. The ribbon feed mechanism is furnished with a ribbon feed escape mechanism which, powered by the movement of the carriage 27, feeds the ribbon of the ribbon cassette 29 in one direction with no regard to the direction of movement of the carriage 27 and, during a one-directional printout mode, interrupts the feed of the ribbon during strokes in the other direction.

Figure 6:
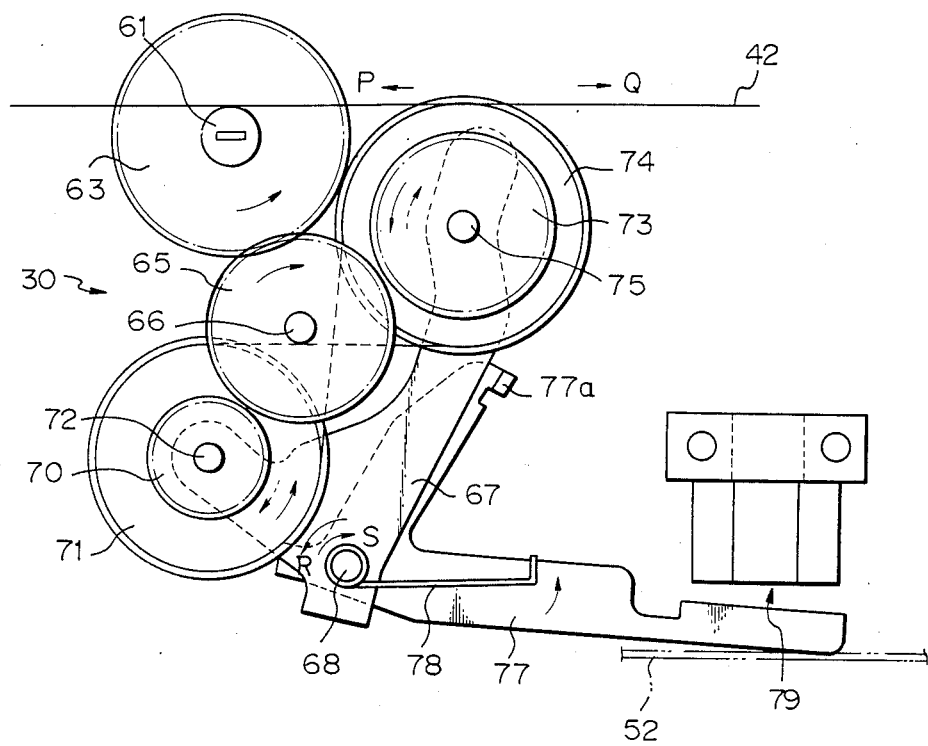
FIG. 6 is a plan view of a ribbon feed mechanism included in the same mechanism.

Details of the ribbon feed mechanism 30 will be described with reference also made to FIG. 6. The mechanism 30 includes a drive shaft 61 which is biased by a spring from the inside and provided with a ribbon feed gear 63. The ribbon feed gear 63 is rotatably mounted by a bearing 64 to the underside of the top plate 52 with the drive shaft 61 positioned on the upper surface of the top plate 52. An idler gear 65 is rotatably mounted to the top plate 52 by a shaft 66 and constantly meshed with the ribbon feed gear 63. A generally L-shaped lever 67 is pivotally mounted to the underside of the top plate 52 by a stud 68. A shaft 72 extends from one end of the pivotal lever 67, while a pulley 71 carrying a comparatively small diameter gear 70 therewith is rotatably mounted on the shaft 72. The gear 70 is engageable with the idler gear 65. Also, a shaft 75 extends from the other end of the lever 67, while a pulley 74 having the same diameter as the pulley 71 is rotatably mounted on the shaft 75. The pulley 74 integrally carries therewith a comparatively large diameter gear 73 which is engageable with the idler gear 65. Alternatively, the gears 70 and 73 may be provided with the same diameter and the pulleys 71 and 74 different diameters, or both the gears 70 and 73 and the pulleys 71 and 74 may be provided with different diameters. Each of the pulleys 71 and 74 is provided with smooth upper and lower recesses in order to prevent various runs of the wire 42 from making contact with each other.

The wire 42 is passed over the pulleys 71 and 74 crosswise so that the pulleys 71 and 74 may rotate in opposite directions to each other. Specifically, the wire 42 is passed clockwise over the lower recess of the pulley 74 from the left, then passed counterclockwise over the lower recess of the pulley 71, then shifted to the upper recess of the same pulley 71, then passed clockwise over the upper recess of the pulley 74, and then pulled out to the right. Since the wire 42 is fixed in the manner described, when the carriage 27 strokes in a direction indicated by an arrow Q (forwardly) in FIG. 6, the wire 42 behaves as if it were pulled in a direction indicated by an arrow P with the result that the pulley 71 is rotated as indicated by a solid arrow, the pulley 74 as indicated by a phantom arrow, and the lever 67 as indicated by an arrow R. This causes the large diameter gear 73 associated with the pulley 74 to mesh with the idler gear 65 to thereby drive the latter as indicated by a solid arrow, the idler gear 65 in turn driving the ribbon feed gear 63 as indicated by a solid arrow.

As the carriage 27 strokes in the direction P (backwardly), the wire 42 behaves as if it were pulled in the direction Q so that the pulley 71 is rotated as indicated by a phantom arrow, the pulley 74 as indicated by a solid arrow, and the lever 67 as indicated by an arrow S. As a result, the small diameter gear 70 associated with the pulley 71 meshes with the idler gear 65 to drive the idler gear 65 and, thereby, the ribbon feed gear 63 as indicated by the arrow.

As described above, while the carriage 27 strokes in any of the forward and backward directions, the ribbon feed gear 63 is constantly rotated in the same direction as indicated by the solid arrow and, thereby, feeds the ribbon in the same direction.

Now, the ribbon feed mechanism 30 having the above construction successfully feeds the ribbon, whichever the direction of carriage movement may be in a bidirectional printout mode. This, however, wastes ribbon in a one-directional printout mode because a ribbon, particularly a film ribbon, would be fed unused. In accordance with the present invention, the mechanism 30 is furnished with a ribbon feed escape mechanism which in a one-directional printout mode (forward printout only) prevents the mechanism 30 from feeding the ribbon during backward strokes of the carriage 27.

Specifically, the ribbon feed escape mechanism includes a generally L-shaped escape lever 77 which is rotatably mounted on a stud 68 and provided at one end with a pawl 77a which is engageable with the lever 67. A spring 78 constantly biases the escape lever 77 to the illustrated retracted position which allows the lever 68 to move. An escape magnet 79 is adapted to selectively attract the other end of the escape lever 77. During a bidirection printout mode, the escape magnet 79 is deactivated and the escape lever 77 is urged by the spring 78 to the retracted position, so that the lever 67 may be moved to feed the ribbon in the same direction responsive to the strokes of the carriage in either direction as previously stated.

During a one-directional printout mode, on the other hand, the escape magnet 79 is activated when the carriage 27 moves in the direction P. Then, the escape lever 77 is rotated as indicated by a solid arrow against the action of the spring 78 so that its pawl 77a prevents the lever 67 from rotating in the direction S beyond a predetermined extent. As a result, the lever 67 is held in the illustrated neutral position which allows none of the gear 73 of the pulley 74 and the gear 70 of the pulley 71 to mesh with the idler gear 65, thereby maintaining the ribbon feed gear 63 unrotated and, thereby, the ribbon unfed. In this manner, during a one-directional printout mode, the ribbon feed is interrupted while the carriage 27 strokes in the other direction.

A font cassette associated with the printer of the present invention is constructed as follows.

Figure 7:
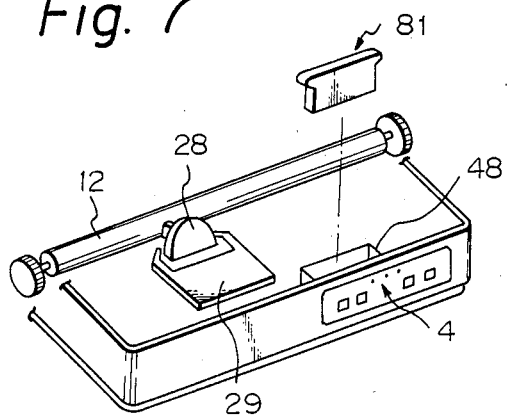
FIG. 7 is a perspective view useful for the description of loading and unloading of a font cassette.
Figure 8:
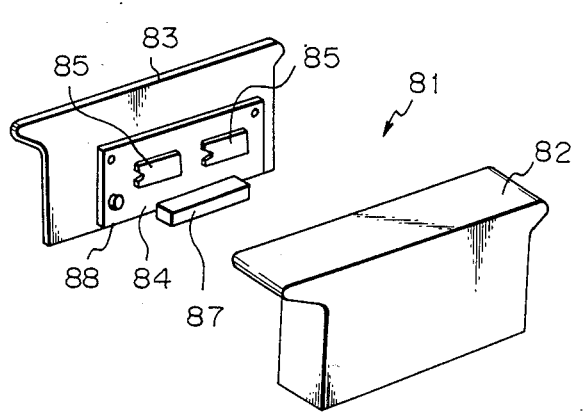
FIG. 8 is a perspective view of the font cassette.
Figure 9:
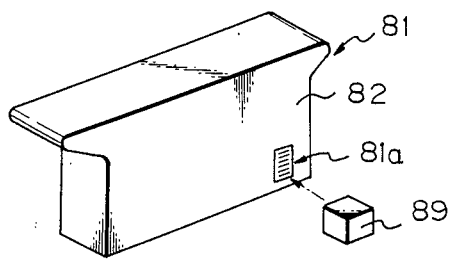
FIG. 9 is a perspective view of another specific construction of the font cassette.

Referring to FIG. 7, a font cassette 81 is loaded in the cassette holder 48 which is mounted on the back of the control panel 4. The font cassette 81 comprises a casing which is made up of a cassette case 82 and a cassette board 83. Inside of the casing, a board 84 is fixed to the cassette board 83. Arranged on the board 84 are a read only memory (ROM), a random access memory (RAM) and like store elements 85 and 85, and a connector 87 which is connectable to the connector 49 which is associated with the cassette holder 48. Further, where the store elements are volatile, a backup battery 88 is mounted on the board 84. The store elements 85 and 85 store various data inclusive of character pattern data associated with various fonts and data associated with printout modes associated with the stored fonts (font identification data), as described later in detail. Concerning the font identification data, as shown in FIG. 9, they may be stored in the form of a bar code 81a which is provided on the outer surface of the cassette case 82, in which case a bar code reader 89 will be fixed to the printer body for reading the bar code 81a.

Figure 10B:
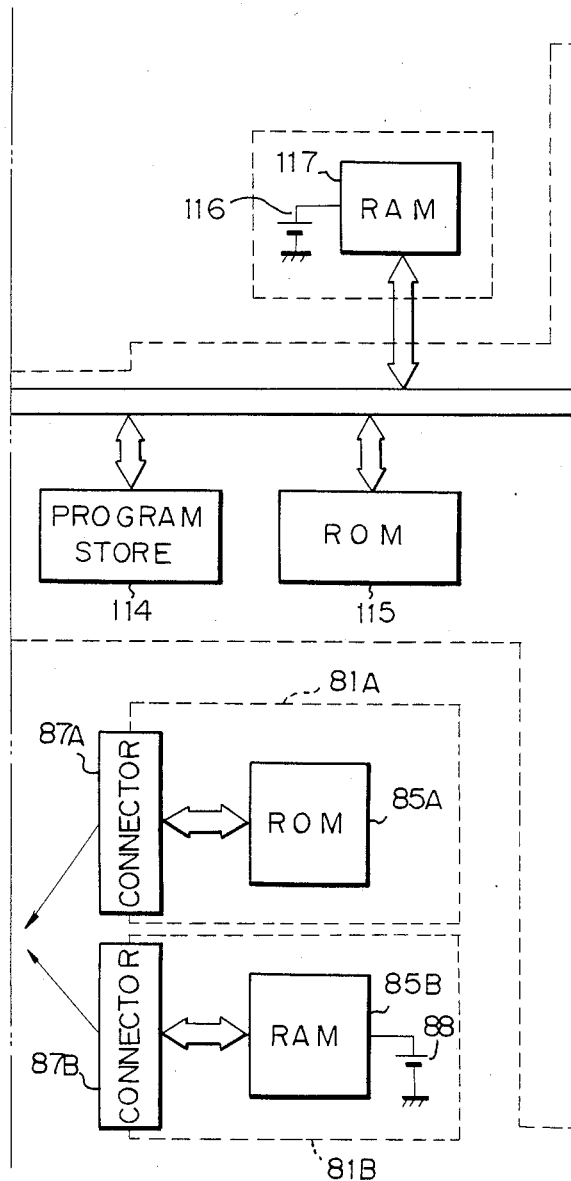
Figure 10C:
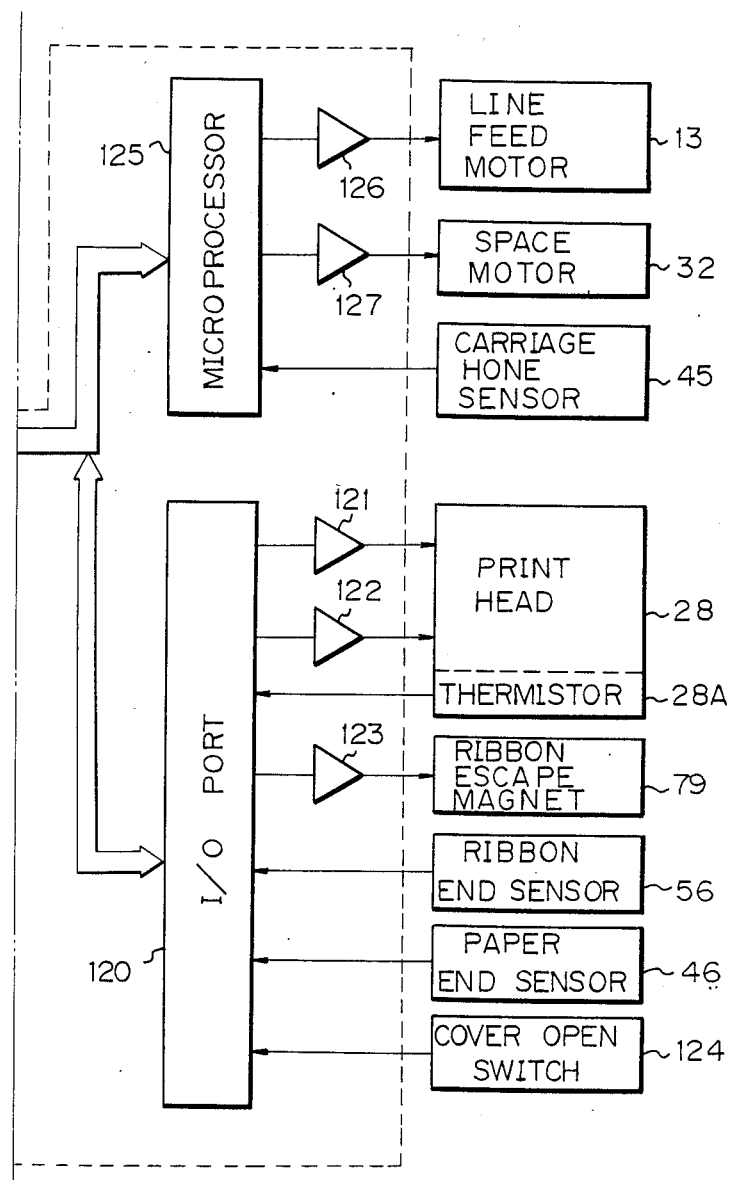

Referring to FIG. 10, the control section of the printer is shown and includes a printer controller 100 adapted to supervise the operations of the whole printer. The controller 100 is connected to a host system through an interface (I/F) connector 101 to exchange various I/F data such as character code data, carriage movement data and line feed data from the host system. The printer controller 100 is also connected by a connector 102 and a cable 103 to a connector 104 provided in the control panel 4 so as to receive signals representative of statuses of various panel switches on the control panel 4, while delivering on/off control signals to the control panel 4 for controlling various displays. The control panel 4 is provided with various panel switches 105 and displays 106, and a latch 107 for latching signals which are exchanged between the panel switches 105 and displays 106 and the controller 100.

Further, the print controller 100 fetches through the control panel 4 pattern data from font cassette 81A or 81B which is loaded in the cassette holder 48 of the control panel 4 and connected to the connector 49. The font cassette 81A comprises a ROM 85A which stores pattern data and others and a connector 87A which is connectable to the connector 49 of the control panel 4. The font cassette 81B, on the other hand, comprises a RAM 85B which stores pattern data and others and is backed up by the battery 88, and a connector 87B connectable to the connector 49.

In detail, the printer controller 111 includes a master microprocessor 111 which fulfills various controls over the printer except for space drive and line feed drive, e.g. processing I/F data fed from the host system, controlling the control panel 4, controlling the print head 28, and monitoring various sensors. The master microprocessor 111 bifunctions as buffer control means. Specifically, the master microprocessor 111 is connected to a bus via a bus driver 112 to read various data applied from the host system to an I/O port 113, operation data from the control panel 4, output signals of various sensors, font identication data or pattern data from the font cassette 81A or 81B, and other data. Processing such data, the master microprocessor 111 performs various controls as will be described.

For example, the master microprocessor 111 transforms print data supplied thereto from the host system into image data by means of a ROM 115, the previously mentioned font cassette 81A or 81B, and a RAM 117 which stores pattern data (hereinafter, these elements will collectively be referred to as a "character generator CG"), and develops the image data in a data buffer (image buffer) 118. Backed up by an external battery 116, the RAM 117 serves to download pattern data which are transferred from the host system so that even special characters may be readily coped with. Likewise, where the font cassette is implemented with a battery backed up RAM or an electrically rewritable ROM (EEPROM), for example, special characters and the like may be printed out with ease by downloading pattern data from the host system to the font cassette.

When developed one line of image data on the data buffer 118, the master microprocessor 111 reads the image data out of the data buffer 118 and delivers them to an I/O port 120 to control head drivers 121 and 122, thereby controllably driving pins (print elements) of the print head 28. The microprocessor 111, depending upon the printout mode which is either one-directional or bidirectional, controls a magnet driver 123 via the I/O port 120 so as to controllably drive the ribbon escape magnet 79. Applied through the I/O port 120 to the microprocessor 111 are output signals of various sensors such as a thermistor 28A mounted in the print head 28 to sense head temperature, the ribbon end sensor 56, the paper end sensor 46, and a cover open switch 124. Responsive to such sensor outputs, the microprocessor 111 controls the drive time of the print head 28 (temperature control), on/off of the displays on the control panel 4, stop/start of printer operation, etc.

The master microprocessor 111 supplies a slave microprocessor 125 with carriage movement data representative of an amount and a direction of carriage movement and paper feed data representative of an amount and a direction of paper feed, based on carriage movement data and line feed data which are fed from the host system to the microprocessor 111. Responsive to the paper feed data from the master microprocessor 111, the slave microprocessor 125 controls a line feed driver 126 which then drives the line feed motor 13 and, thereby, the platen 12 to feed the paper. Further, responsive to the carriage movement data from the master microprocessor 111, the slave microprocessor 125 controls a space driver 127 to drive the space motor 32 so that the carriage 27 is moved to a necessary position.

The operation of the printer in accordance with the present invention will be described with reference also made to FIG. 11 and onward.

Figure 11:
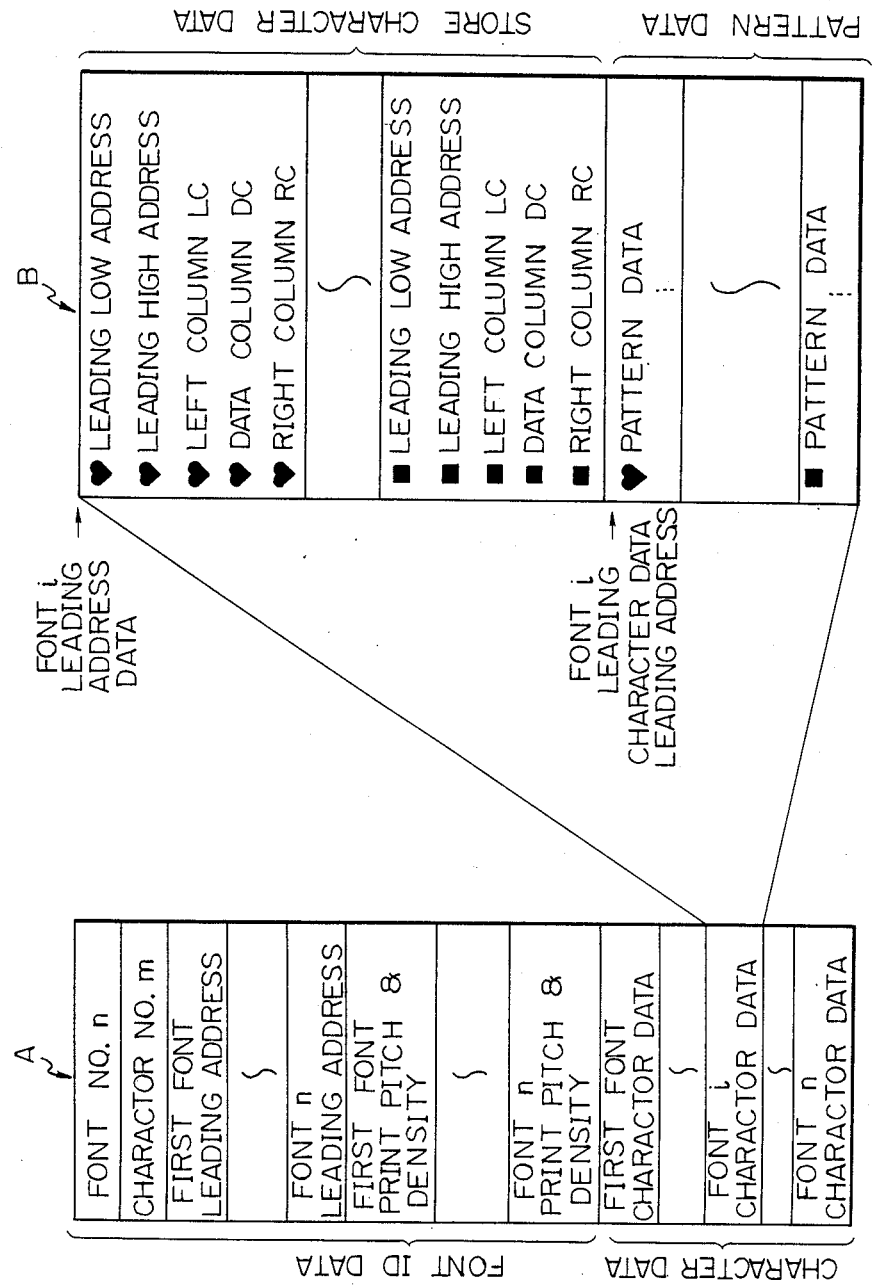
FIG. 11 is a view useful for the description of data which are stored in the font cassette.

The store element 85 of the font cassette 81 stores font identification data and character data, as shown in A of FIG. 11. The font identification data consist of font numbers n stored in the front cassette, character numbers m, the first font leading address to the n font leading address representative of the leading addresses of the character data areas which are assigned to the first to the n fonts, and the first font print pitch and print density to the n font print pitch and print density representative of print configurations of the first to the n fonts.

The character data consist of character data associated with the first to the n fonts. As shown in B of FIG. 11, the character data associated with each of the fonts are made up of stored character data and pattern data. In FIG. 11, the i font should be understood as implying any one of the first to the n fonts. Concerning the stored character data, they consist of a leading low address, a leading high address, a left column number LC, a data column number DC, and a right column number RC for each of the characters.

In this manner, the stored character data are each in five bytes for a single character; assuming that 226 characters are stored, then 226×5=1130 bytes. As to the pattern data, pattern data associated with all the characters belonging to the i font are stored, e.g. 226 characters of pattern data. In the example shown in FIG. 11, marked with heart are the leading character pattern of the i font and marked with square are the trailing character pattern. However, such is only illustrative.

The pattern of a character "@" may be printed out in various fonts as shown in FIGS. 12–16.

Figure 12:
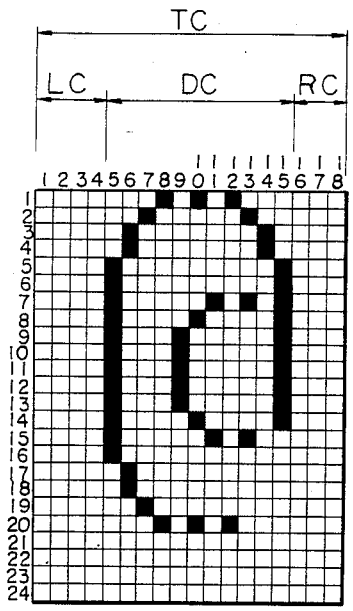
FIGS. 12-16 show specific examples of character patterns which belong to different fonts.
Figure 13:
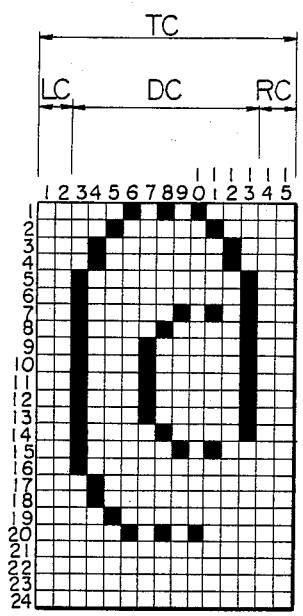
Figure 14:
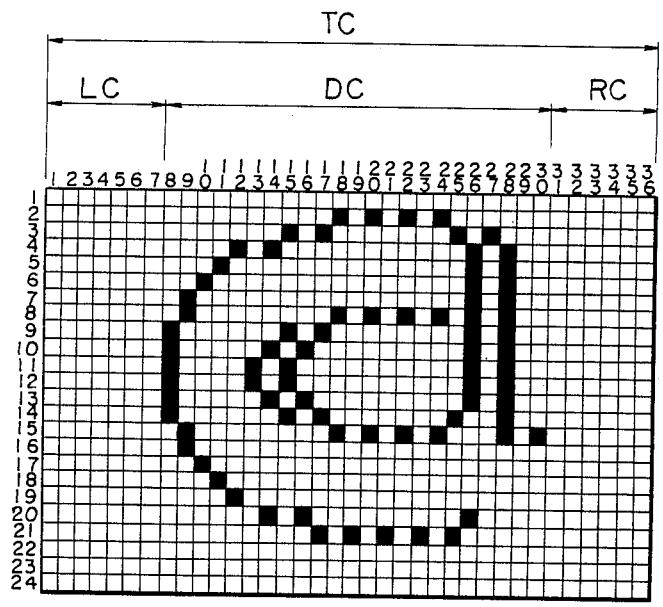
Figure 15:
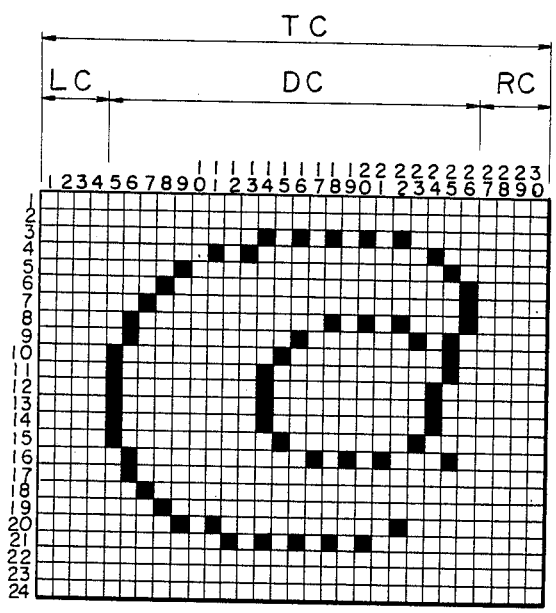
Figure 16:
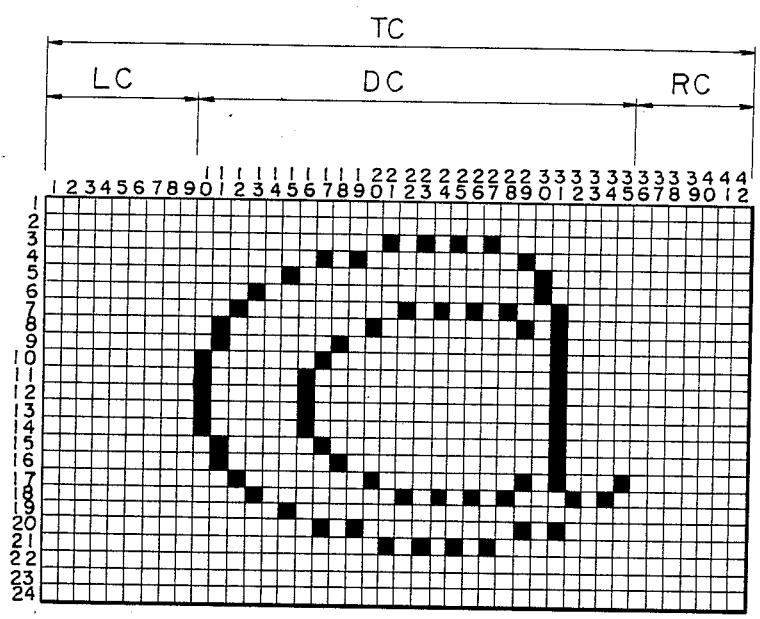

FIG. 12 shows the character @ in "Letter Gothic 10" in which TC (total column)=18, LC=4, DC=11, and RC=3. FIG. 13 shows it in "Letter Gothic 12" in which TC=15, LC=2, DC=11, and RC=2. FIG. 14 shows it in "Courier 10" in which TC=36, LC=7, DC=23, and RC=6. FIG. 15 shows it in "Prestige Elite 12" in which TC=30, LC=4, DC=22 and RC=4. Further, FIG. 16 shows it in "Bold Face P.S" in which TC=7×6=42, LC=9, DC=24, and RC=7. In the case of the font shown in FIG. 16, the total column number TC depends upon the character, i.e., TC=number of units×6; in the illustrated example, the number of units is seven.

Reference will be made to FIGS. 17A and 17B and FIGS. 18A and 18B which illustrate different systems available for storing such character pattern data in a store element.

Figures 17A, 17B:
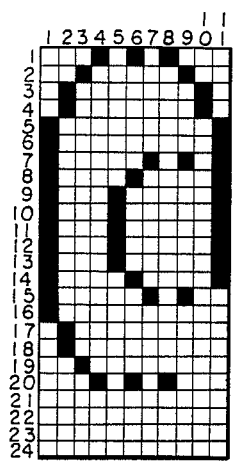

FIG. 17A shows a character pattern (DC=11) having the first to the twenty-fourth rows. As shown in FIG. 17B, the first to the twenty-four rows of each column of the pattern shown in FIG. 17A are sequentially stored by each eight bits (one byte). Specifically, the first to the eighth rows of the first column (twenty-four dots) are stored in the first byte, the ninth to the sixteenth rows in the second byte, and the seventeenth to the twenty-fourth rows in the third byte. The same holds true with the second to the DC rows. In the system shown in FIGS. 18A and 18B, concerning the character pattern shown in FIG. 18A (DC=11), the first, third, fifth, seventh, ninth, eleventh, thirteenth and fifteenth rows of the first column (twenty-four dots) are stored in the first byte, the seventeenth, nineteenth, twenty-first, twenty-third, twentieth, twenty-second and twenty-fourth rows in the second byte, and the second, fourth, sixth, eighth, tenth, twelfth, fourteenth and sixteenth rows in the third byte. The same holds true with the second to the DC rows. In short, the system of FIGS. 18A and 18B is such that in each column the first to the twenty-fourth rows are divided into odd rows and even rows, the odd rows and the even rows are individually subdivided by eight bits (one byte), and the remaining four bits of each of the odd and even rows are stored together as eight bits (one byte).

The store system shown in FIGS. 18A and 18B is directed to enhancing high-speed processing in relation to a print head PH shown in FIG. 19 in which pins (print elements) 1-24 are arranged in an array PHO of odd pins and an array PHE of even pins, the two arrays being staggered from each other. Specifically, in such a particular pin arrangement, after the odd pin array has printed out dots in a given line, the even pin array prints out dots when reached that line. Then, should the odd column (odd pins) and the even column (even pins) be alternately stored on a bit basis, each of all the one-byte data would always need to be reedited into odd row (odd pin) data and even row (even pin) data. In contrast, where odd row (odd pin) data and even row (even pin) data are stored independently of each other as shown in FIGS. 18A and 18B, what is required is, concerning the first column, for example, merely directly outputting the data in the first and third bytes and divisionally outputting the data in the second byte only. This promotes the ease of processing to a significant extent and, thereby, enhances fast processing.

Next, data stored in a font cassette and representative of print configurations (print pitches and print densities) will be described with reference to FIGS. 20-24.

Assuming that the maximum response frequency of the pixel forming means (print elements=print pins) of the print head PH is f (hertz) (repetition period=T), and that the density (resolution=print density) of pixels is D (millimeter), two different methods are available: driving each of the print elements at each print density D, and driving it in a thinned manner at the printing pitch P=lD (millimeter), where l is an integer. The first-mentioned method is equivalent to the second-mentioned method when l in the latter is 1 (one). To print out characters as fast as possible while preserving acceptable printout quality, the print density D should be controlled as low as possible. This, coupled with adequately determining the integer as l=2, 3 . . . , will realize high-resolution and high-speed printout. In this instant, the velocity V (millimeter per second) of the carriage is expressed as:

$$V = P/T = l \cdot D/T$$

That is, decreasing the print density D enhances the resolution, while selecting a value which is not greater than 2 as the integer l increases the carriage velocity, i.e. print speed.

Figure 20:
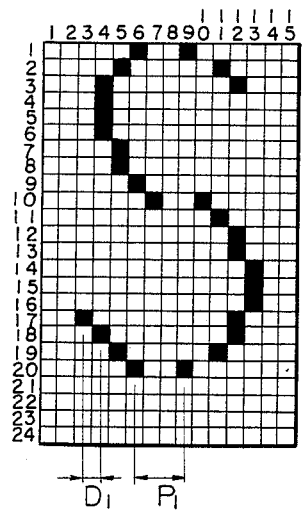
FIGS. 20-24 show patterns which are representative of specific examples of different print configurations.
Figure 21:
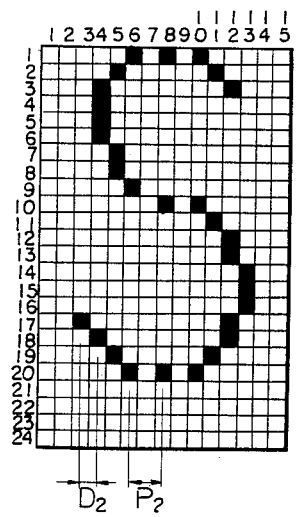
Figure 22:
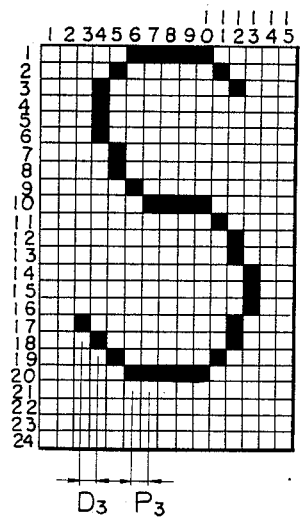
Figure 23:
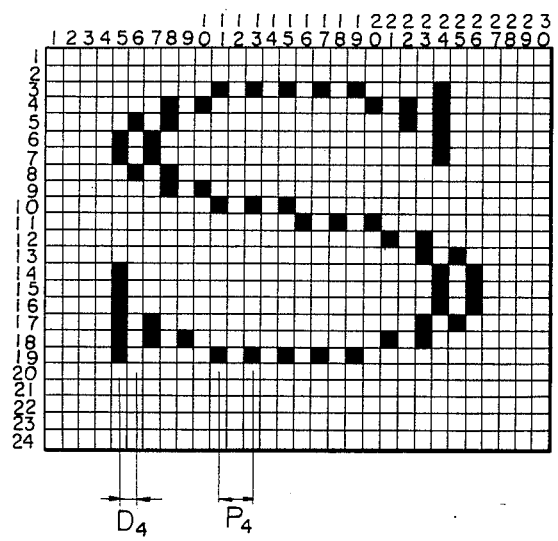
Figure 24:
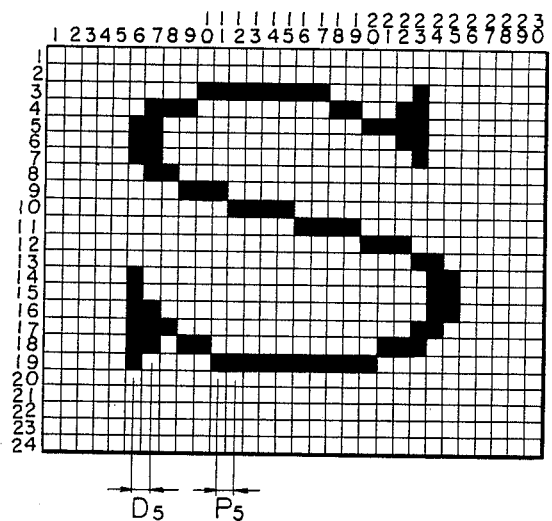

Different print configurations are shown in FIGS. 20-24. In FIG. 20, an example of a character printed out by ultrahigh-speed printing is shown. Ultrahigh-speed printing is effected with a print density $D=1/180$ inch, $l_1=3$, and print pitch $P_1=3D_1=1/60$ inch, and by moving the carriage at a velocity $V_1=1/60T$ (inch per second). In FIG. 21, an example of high-speed printing is shown which is implemented with a print density $D_2=1/180$ inch, $l=2$, and print pitch $P_2=2D_2=1/90$ inch, and by moving the carriage at a velocity $V_2=1/90T$ (inch per second). In FIG. 22, an example of ordinary printing is shown which is obtainable with a print density $D_3=1/180$ inch, $l_3=1$, and a printing pitch $P_3=1D_3=1/180$ inch, and moving the carriage at a velocity $V_3=1/180T$ (inch per second). In FIG. 23, an example of high-quality printing is shown which is implemented with a print density $D_4=1/360$ inch, $l_4=2$, and a print pitch $P_4=2D_4=d/180$ inch, and moving the carriage at a velocity $V_4=1/180T$ (inch per second). Further, in FIG. 24, an example of an ultrahigh-quality printing is shown which is attainable with a print density $D_5=1/360$ inch, $l_5=1$, and a print pitch $P_5=1D_5=1/360$ inch, and moving the carriage at a velocity $V_5=1/360T$ (inch per second).

Where particular data representative of print configurations such as ultrahigh-speed printing, high-speed printing, ordinary printing, high-quality printing, ultrahigh-quality printing and others are stored in terms of print densities and print pitches as described above, it is possible to print out characters in various configurations by performing printout control and merely by replacing a font cassette.

Figure 25B:
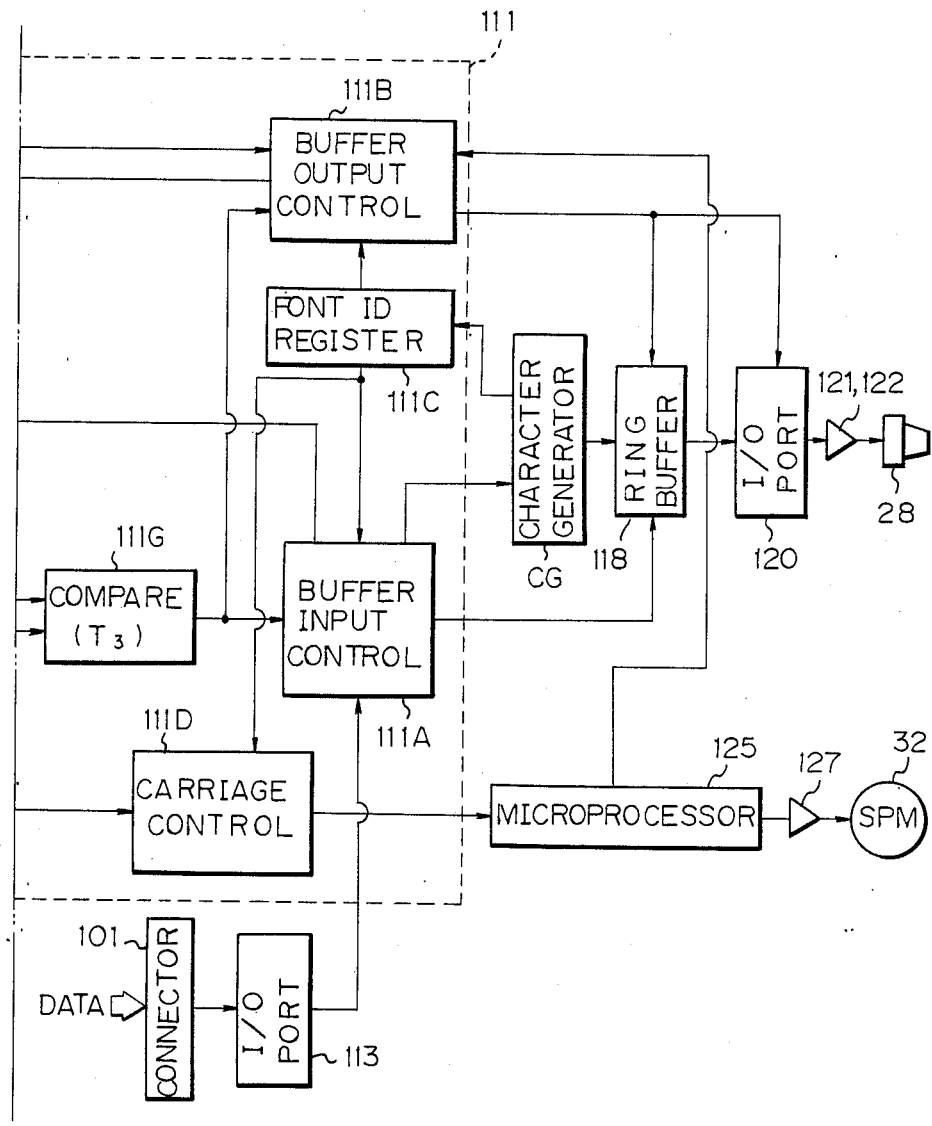

Referring to FIG. 25, the printout control which is assigned to the master microprocessor 111 is shown in a functional block diagram. A buffer input control 111A processes I/F data (character data and others) which come in through the I/O port 113 and, based on the result of the processing, controls the character generator CG to store character pattern data (image data) in the data buffer (ring buffer) 118. A buffer output control 111B reads image data out of the data buffer 118 to controllably drive the print elements of the print head 28. A font identification register 111C serves to store various font identification data which are generated by the character generator CG. A carriage control 111D generates carriage movement data for controllably driving the space motor 32 and delivers it to the slave microprocessor 125.

As shown in FIG. 26, a print start pointer PT2 is adapted to indicate a print start position, a print end pointer PT3 a print end position, and a carriage current point PT1 a current position of the carriage 27, or that of the print head 28. A current row store direction flag T2 is representative of a store direction of image data in a current row which is stored in the data buffer 118, and a print direction flag T1 a current print direction.

A compute section 111E reads the print point PT2 and print end pointer PT3 to provide a center pointer $PT4=(PT2+PT3)/2$. A compare section 111F compares the center pointer PT4 provided by the compute section 111E with the carriage current pointer PT1 to determine a print direction and, based on the result, sets the print direction flag T1. A compare section 111G compares the current row store direction flag T2 with the print direction flag T1 to determine a store direction of the next row into the data buffer (ring buffer 118) and, based on the result, sets the flag $T_3$ which serves as a next row store direction flag for the buffer input control 111A and an output directoion flag for the buffer output control 111B.

Figure 27B:
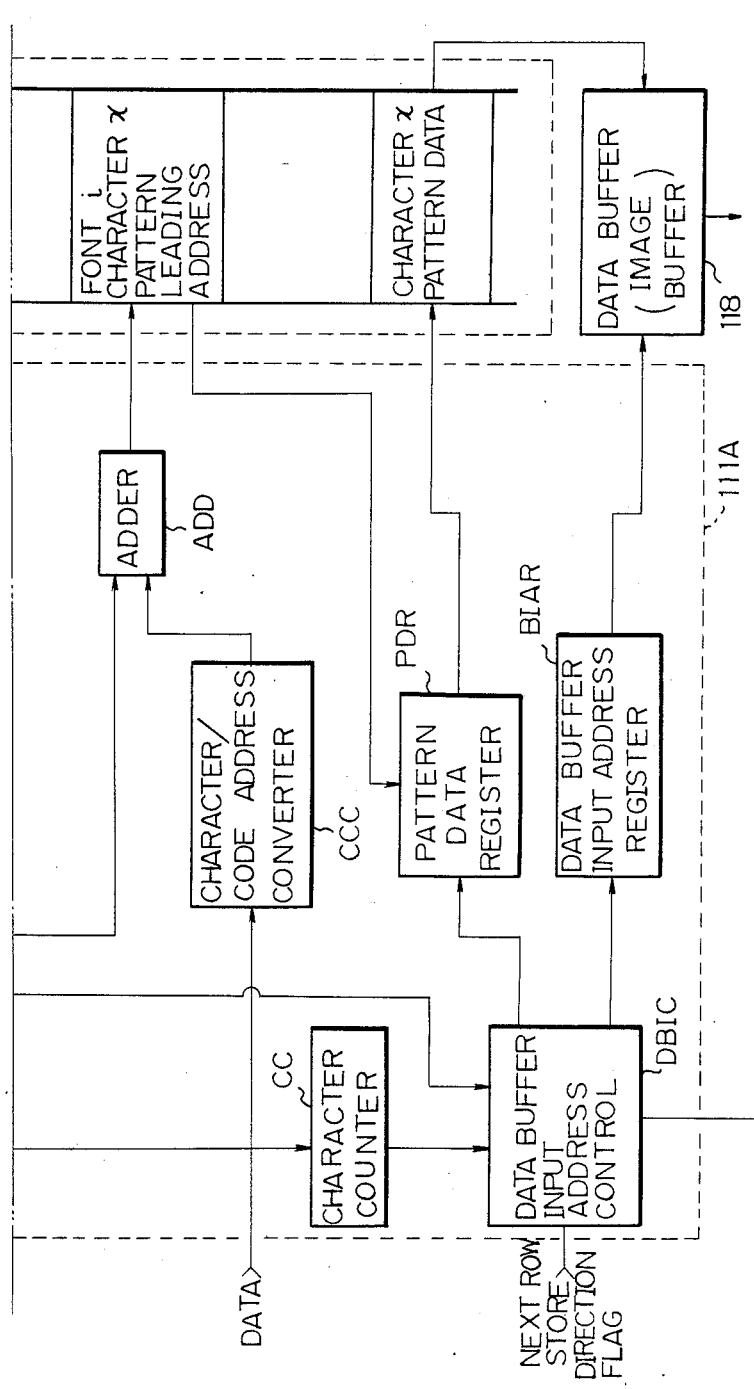
Figure 27C:
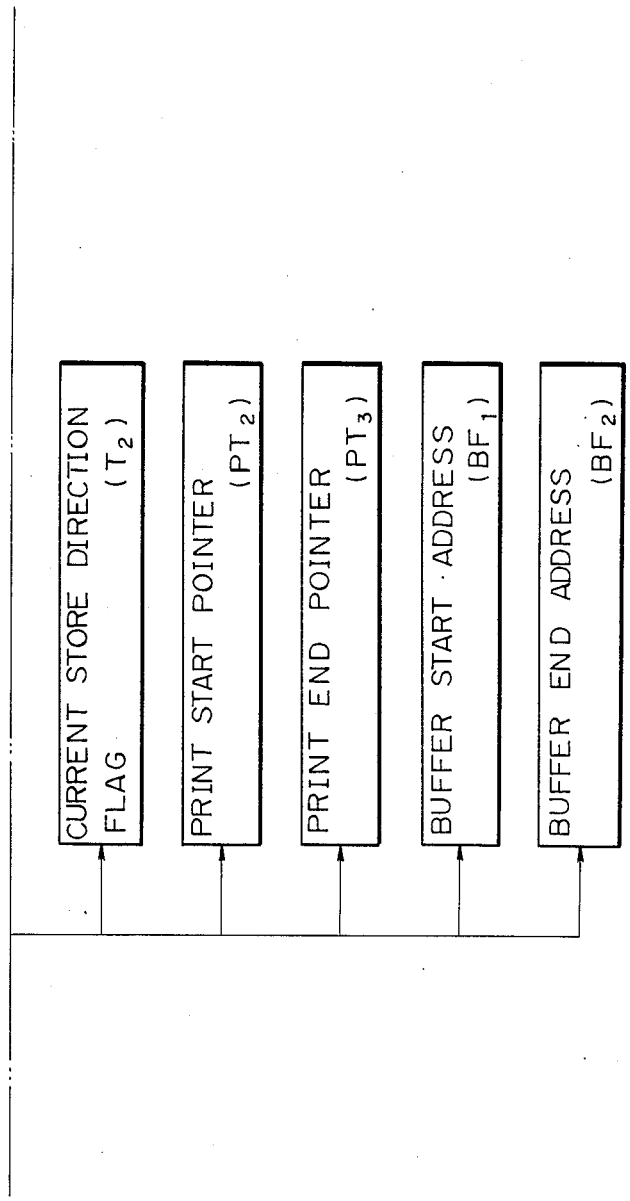

The processing assigned to the buffer input control 111A will be described with reference to FIG. 27. First, if the I/F data from the host system is font selection data, a font select section FSE of the buffer input control 111A accesses the font identification data store area of the character generator DG to read out font identification data and store them in respective registers of the font identification register 111C. Specifically, among the font data read out of the character generator CG, the font number n is stored in a font number register Rn, the i font leading address (ADRS) in an i font leading address register RA, the print pitch P in a print pitch register RP, and the print density D in a print density register ED. The font select section FSE decides whether the font number n stored in the register Rn is identical with the font number indicated by the font selection data and, if not, repeatedly and sequentially accesses the other front identification data store areas of the character generator until coincidence is set up.

Consequently, in the respective registers of the front identification register 111C the font number n, i font leading address (ADRS) i, print pitch P and print density D associated with the designated font are stored. Thereafter, as character data indicative of any particular character x, a character code/address convert section CCC converts it to address data. An add section ADD adds the output address of the convert section CCC to the i font leading address (ADRS) i which has been stored in the i font leading address register RA, thereby generating address data representative of the leading address of the character x pattern of the i font. Based on the address data output from the adder ADD, a particular address of the character generator CG which stores the leading address of the character x pattern of the i font is accessed so that the leading address data of the character x pattern of the i font is transferred to a pattern data register PDR.

The character generator CG is accessed by the i font, character x pattern data leading address data which has been stored in the pattern data register PDR, whereby data in the first byte of the pattern data representative of the character x are read out. Thereafter, the i font, character x pattern data leading address of the pattern data register PDR is incremented by a data buffer input address control section DBIC, which will be described, at a timing which will also be described. As a result, an i font, x pattern data address is generated to access the character generator CG again, so that data in the second byte of the character x are read out. Such a procedure is repeated to retrieve all the pattern data associated with the character x.

Meanwhile, when a character code is supplied from the host system, it increments a character counter CC. The character counter CC counts up when one line of character codes have been entered. A data buffer input address control section DBIC is supplied with the next row store direction flag T3 output from the compare section 111G, a countup signal output from the character counter CC, and a print density D output from a print density register RD of the font register. Responsive to such inputs, the data buffer input address control DBIC determines input addresses of the data buffer 118 and transfers them to a data buffer input address register BIAR. Then, the pattern data which are read out of the character generator CG byte by byte as previously mentioned are loaded in the addresses which have been set in the data buffer input address register BIAR.

Thereafter, the data buffer input address control DBIC continuously increments the pattern data register PDR and increments or decrements the data buffer address register BIAR until the character counter CC produces a countup signal. This allows pattern data read out of the character generator CG to be sequentially loaded in specific addresses of the data buffer 118 one byte at a time. When the character counter CC has counted up with one line of pattern data fully stored, the data buffer input address control DBIC again checks the next row stored direction flag T3 and, then, repeats the above procedure. Also, the data buffer input address control DBIC sets the current row store direction flag 2, print start point PT2, print end pointer PT3, buffer start address BF1, and buffer end address BF2.

The print pitch P and the print density D which respectively are stored in the print pitch register PR and the print density register of the font identification register 111C are delivered to a carriage velocity decide section CV to determine a carriage velocity. The slave microprocessor 125 responsive to the determined carriage velocity controls the carriage velocity in conformity to the particular print pitch and density, i.e. print configuration.

Figure 28:
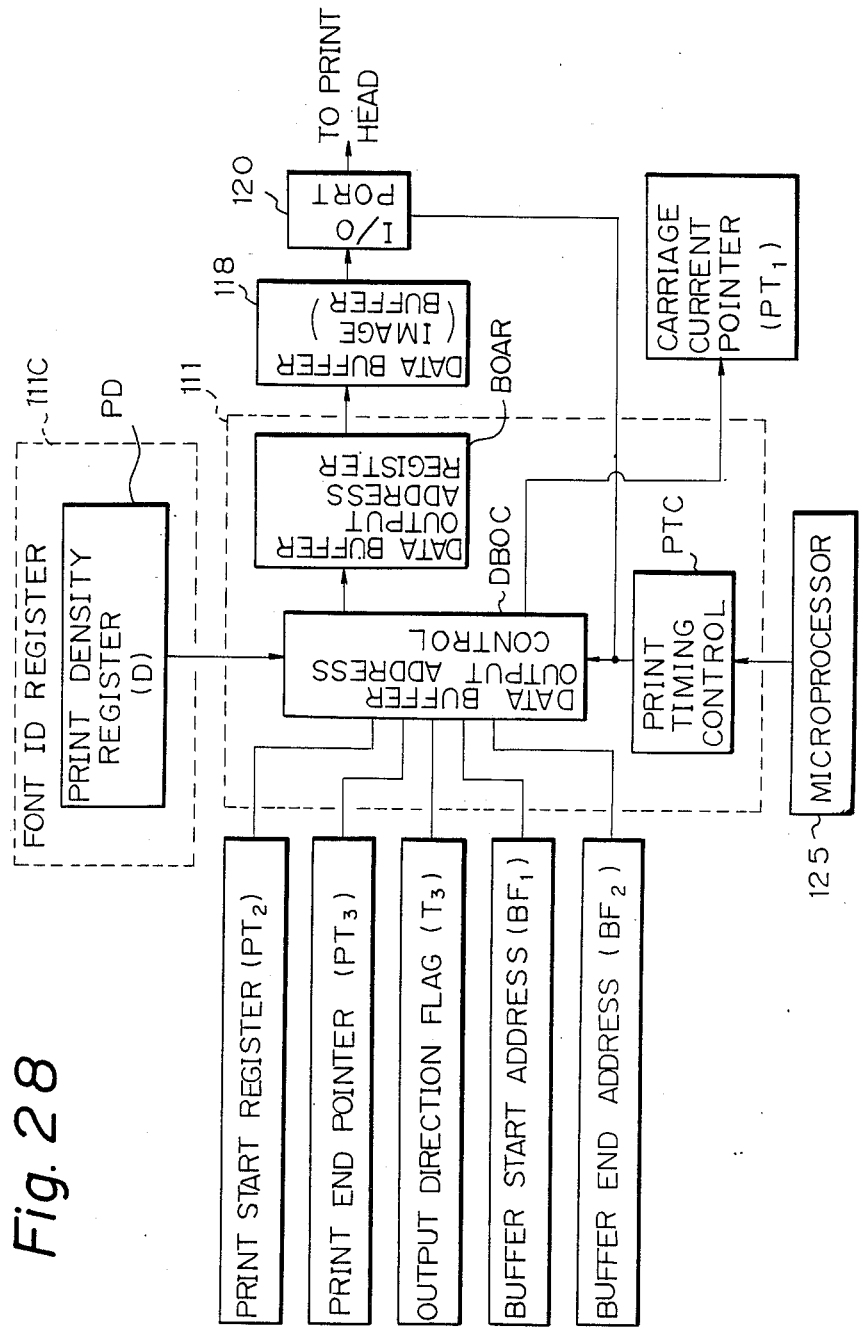
FIG. 28 is a functional block diagram associated with a buffer output control of FIG. 25.

The processing assigned to the data buffer output control 111B will be described with reference to FIG. 28. When a carriage movement clock interrupt signal is applied from the slave microprocessor 125, a print timing control section PTC delivers a print timing signal to a data buffer output address control section DBOC. The data buffer output address control DBOC reads the print start pointer PT2, print end pointer PT3, buffer start address BF1 and buffer end address BF2 which are set by the data buffer input control 111A as previously stated, the output direction flag (next row store direction flag) T3 set by the compare section 111G, and the print density D from the print density register RD of the font identification register 111C.

Based on those data, the output address control DBOC determines an output address of the data buffer 118 and, then, supplies a data buffer output address register BOAR with output address data. The register BOAR in turn accesses the data buffer 118 using the output address data, whereby image data in that address is read out and fed to an I/O port 120 which receives a timing signal from the print timing control section PTC. Print pins in the print head 28 are selectively driven to print out data responsive to the image data. Also, the data buffer output address control DBOC serves to set a carriage current pointer PT1 as the image data is read out of the data buffer 118.

Figure 29B:
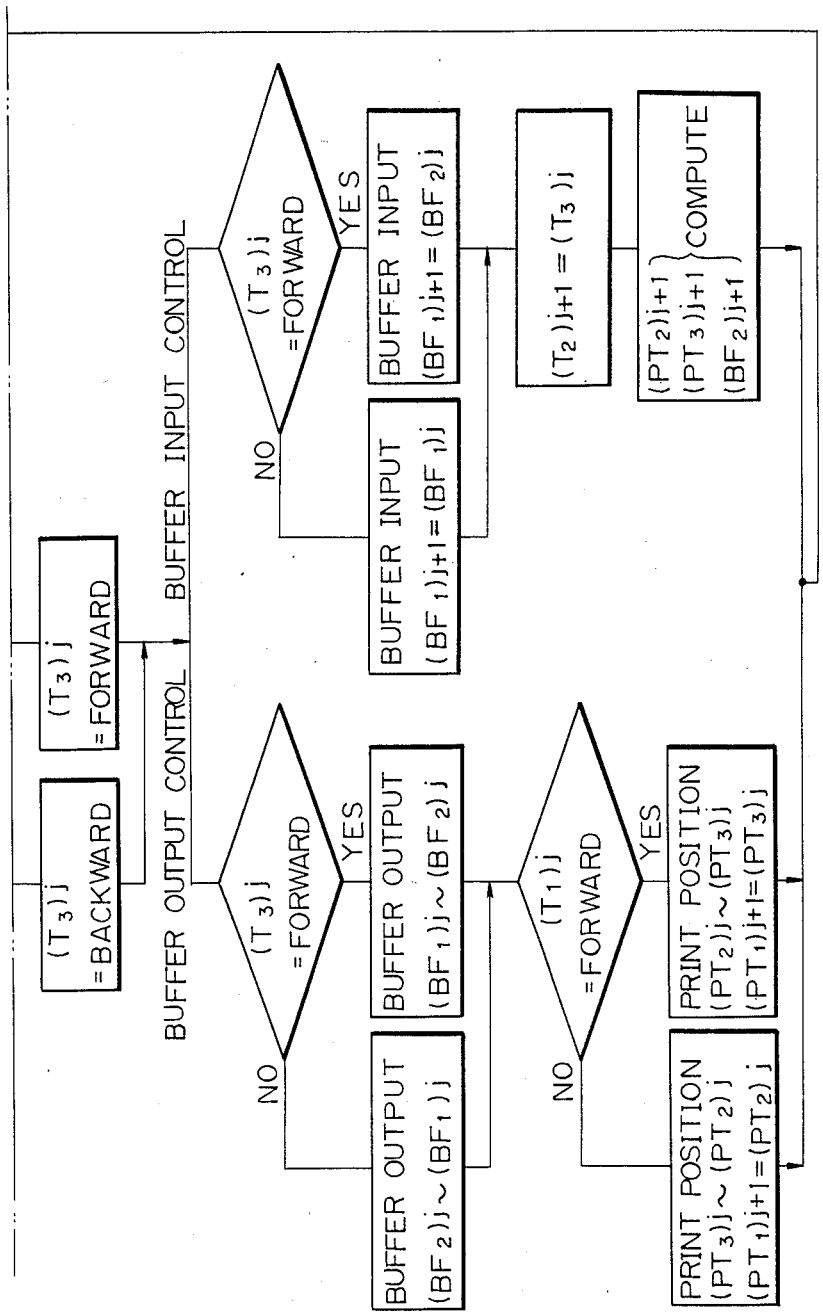

The master microprocessor 111 supervises the data buffer 118 as will be described totally with reference to FIG. 29. Upon entry of a print start command, the microprocessor 111 performs the following operation to compute the center pointer (PT4)j of the j row:

$$(PT4)j = \{(PT2)j + (PT3)j\}/2$$

Then, comparing the center pointer (PT4)j with the carriage current pointer (PT1)j, the microprocessor 111 determines a print direction. Specifically, if $(PT1)j \leq (PT4)j$, implying that the current carriage position is leftwardly of the center of the print range, the microprocessor 111 sets the print direction flag (T1)j to the forward direction; if not $(PT1)j \leq (PT4)j$, implying that the current carriage position is righwardly of the center of the print range, it sets the print direction flag (T1)j to the backward direction.

The print direction is determined responsive to the current carriage position as stated above, so that the carriage can be located in a print start position within the shortest period of time, thereby speeding up the printing operation.

Thereafter, the microprocessor 111 compares the current row store flag (T2) with the print direction flag (T1)j to determine an image data store direction of the j line into the data buffer 118. Specifically, if the current row store direction flag (T2)j = print direction flag (T1)j, the microprocessor 111 sets the next row store direction flag (T3) to the forward because the current row store direction is the same as the print direction, if not (T2)j = (T1)j, the microprocessor 111 sets the flag (T3)j to the backward because the current row store direction is different from the print direction. Meanwhile, in buffer input control processing, the microprocessor 111 determines whether the next row store direction flag (T3)j is forward. If it is forward, the microprocessor 111 uses the buffer start address (BF1)j+1 of the row (j+1) next to the j row as a buffer end address (BF2) of the j row.

If the next row store direction flag (T3)j is not forward, then the microprocessor 111 uses the buffer start address (BF1)j+1 of the row (j+1) next to the j row as a buffer start address (BF1)j of the j row. Subsequently, after causing the current row store direction flag (T2)j to coincide with the next row store direction flag (T3)j, the microprocessor 111 calculates a print start pointer (PT2)j+1, a print end pointer (PT3)j, and a buffer end address (BF2)j. In buffer output control processing, on the other hand, the microprocessor 111 decides whether the output direction flag (T3)j, which also serves as a next row store direction flag, is forward. If it is forward, the microprocessor 111 outputs the buffer start address (BF1)j to the buffer end address (BF2)j of the data buffer 118.

If the flag (T3)j is not forward, the microprocessor 111 outputs the buffer end address (BF2)j to the buffer start address (BF1)j of the data buffer 118. Then, the microprocessor 111 determines whether the print direction flag (T1)j is forward and, if forward, forwardly prints out data selecting the print start pointer (PT2)j to the print end pointer (PT3)j as print positions and selecting the carriage current pointer (PT1)j+1 of the j+1 row as the print end pointer (PT3) of the j row.

If the flag (T1) is not forward, the microprocessor 111 prints out data backwardly selecting the print end pointer (PT3)j to the print start point (PT2)j as print positions and selecting the carriage current pointer (PT1)j+1 of the j+1 row as a print start pointer (PT2)j of the j row. Such a manner of buffer input/output control allows data to be stored (input/output controlled) in the data buffer 118 in a ring structure.

Figure 30:
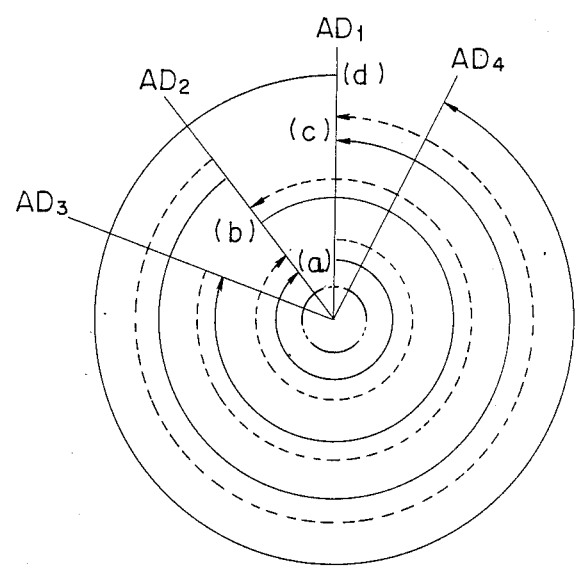
FIGS. 30 and 31 are views useful for the description of a method of storing image data in a data buffer.
Figure 31:
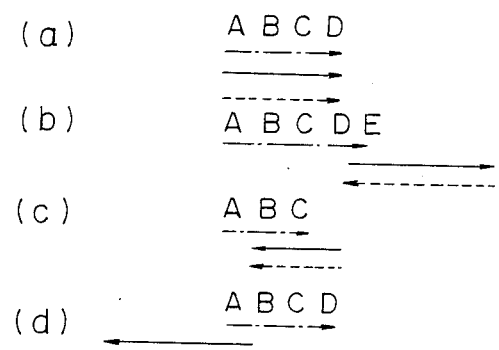

The input/output control in the ring structure mentioned above will be described with reference to FIGS. 30 and 31. In FIG. 30, assume that the time expires from the center toward the output, and that the clockwise direction is forward and the counterclockwise direction backward. In FIG. 31, "A, B, . . . " represents a result of printout. Further, in FIGS. 30 and 31, dash-and-dots lines show data which are applied from the host system, solid lines show buffer input directions, and broken lines show buffer output directions. It will be noted that (a)–(d) in FIGS. 30 and 31 correspond to each other.

Data coming in from the host system side are constantly entered in the forward direction, that is, in such a direction that the carriage is driven forwardly to print out data. Paying attention to this face, as indicated by (a) in FIGS. 30 and 31, an address $AD_1$, for example, of the data buffer 118 is selected as the initial buffer start address BF1 and image data are sequentially entered in the forward direction from the address $AD_1$ to, for example, an address $AD_2$ which is a buffer end address BF2. If the output direction flag T3 of that instant is forward, the image data are sequentially outputted in the forward direction from the address $AD_1$ which is the buffer start address BF1 over to the address $AD_2$ which is the buffer end address BF2. In this manner, since image data are read out of the data buffer 118 in the forward direction, the data buffer sequentially become empty in the forward direction (the next store direction flag $T_3$ becomes forward).

Then, as indicated by (b), the address $AD_2$ which is the buffer end address BF2 is selected as a buffer start address BF1 of the next row (BF2=BF1) and the next row of image data are sequentially loaded in the data buffer 118 starting at the address $AD_2$ and ending at an address $AD_3$, for example, which is a buffer end address BF2. At this instat, if the output direction flag $T_3$ is backward, the image data are sequentially outputted from the address $AD_3$ over to the address $AD_2$. This time, therefore, the image data are read in the backward direction out of the data buffer 118 so that the data buffer 118 sequentially becomes empty in the backward direction (the next row store direction flag T3 becomes backward).

Then, as indicated by (c), the address $AD_2$ which is the buffer end address BF2 is selected as a buffer start address BF1 of the next row and the image data of the next row are loaded in the image buffer 118 backwardly starting at the address $AD_2$, which is the buffer start address BF1, and ending at, for example, the address $AD_1$ which is a buffer end address BF2. If the output direction flag T3 is backward, the image data are sequentially read out from the address $AD_2$ which is the buffer start address BF1 over to the address $AD_1$ which is the buffer end address BF2.

This sequentially empties the data buffer 118 in the backward direction so that, as indicated by (d), the next row of image data will be backwardly entered starting at the address $AD_1$, which is the buffer start address BF1, and down to the address $AD_4$, for example, which is the buffer end address BF2.

In a bidirectional printout mode, particularly a one which is controlled by determining a particular direction, forward or backward, for printing out data with respect to a current carriage position, the ring structure discussed above allows some data to be outputted in parallel relation to entry of other data. Such speeds up the processing for storing image data in a data buffer and, thereby, the whole printing operation.

While the present invention has been shown and described in relation to a wire dot impact printer, the present invention is similarly applicable to various other kinds of printers such as a thermal transfer printer, an ink jet printer and an optical printer which print out data in dots.

In summary, it will be seen that the present invention enables characters which belong to different configurations to be printed out with ease without inviting an increase in the storage capacity of a printer body.

Another advantage attainable with the present invention is that fast entry of print pattern data into a data buffer is realized to promote high-speed data printout.

Various modifications will become possible for those skilled in the art after receiving the teachings of the present disclosure without departing from the scope thereof.

What is claimed is:

1. A dot matrix printer for printing out data in a bidirectional mode comprising:
    a print head capable of incremental movement in either of two directions;
    a first control microprocessor means coupled to said print head for controlling said print head's incremental movement in a given direction;
    a second control microprocessor means for controlling the actuation of various dot firings of said print head;
    a circular memory containing font data for a plurality of characters coupled to said second control microprocessor means;
    wherein said second control microprocessor means in response to a signal to print a character stored in said circular memory computes the center point of a stored character in said memory and wherein further the second microprocessor comprises means to compare said computed center point of said stored character with a current pointer representative of the current position of said print head;
    means for stepping thru said circular memory means in a bidirectional fashion in accordance with and in conjunction with the bidirectional movements of said print head controlled by said first control microprocessor wherein the stepping is under the control of said second microprocessor.

* * * * *